(12) United States Patent
Takasu et al.

(10) Patent No.: US 9,417,448 B2
(45) Date of Patent: Aug. 16, 2016

(54) DISPLAY UNIT

(71) Applicant: YAZAKI CORPORATION, Tokyo (JP)

(72) Inventors: Katsutoshi Takasu, Shizuoka (JP); Akira Masuda, Shizuoka (JP); Takeshi Iwamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 8 days.

(21) Appl. No.: 14/326,045

(22) Filed: Jul. 8, 2014

(65) Prior Publication Data

US 2015/0015963 A1    Jan. 15, 2015

(30) Foreign Application Priority Data

Jul. 10, 2013   (JP) .................. 2013-144889

(51) Int. Cl.
*G02B 27/00* (2006.01)
*G02B 27/01* (2006.01)
(52) U.S. Cl.
CPC ........ *G02B 27/01* (2013.01); *G02B 2027/0141* (2013.01)

(58) Field of Classification Search
CPC ............... G02B 27/0101; G02B 27/01; G02B 2027/014; G02B 2027/0141; G02B 6/00; G09G 3/3406; G09G 3/36; B60K 37/02
USPC ........... 359/630–632, 637, 639, 640; 345/7, 9
See application file for complete search history.

(56) References Cited

U.S. PATENT DOCUMENTS 7,126,583 B1 * 10/2006 Breed .................... B60K 35/00
                                                      345/158
2012/0075708 A1 * 3/2012 Hagiwara .............. B60K 35/00
                                                      359/630

FOREIGN PATENT DOCUMENTS

JP          2006-11122 A      1/2006

* cited by examiner

*Primary Examiner* — Scott J Sugarman
*Assistant Examiner* — Gary O'Neill
(74) *Attorney, Agent, or Firm* — Kenealy Vaidya LLP

(57) ABSTRACT

When a signal indicating that an event involving a need to guide a sight line from an HUD display area to a second display area occurs, a first guide light is displayed, and then a second guide light is displayed.

16 Claims, 19 Drawing Sheets

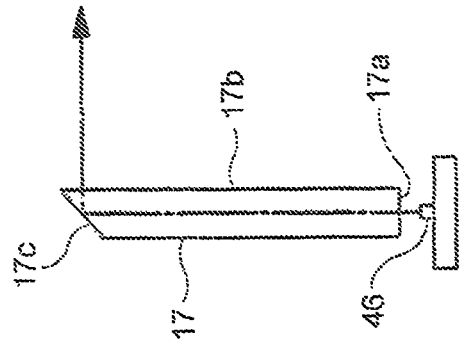
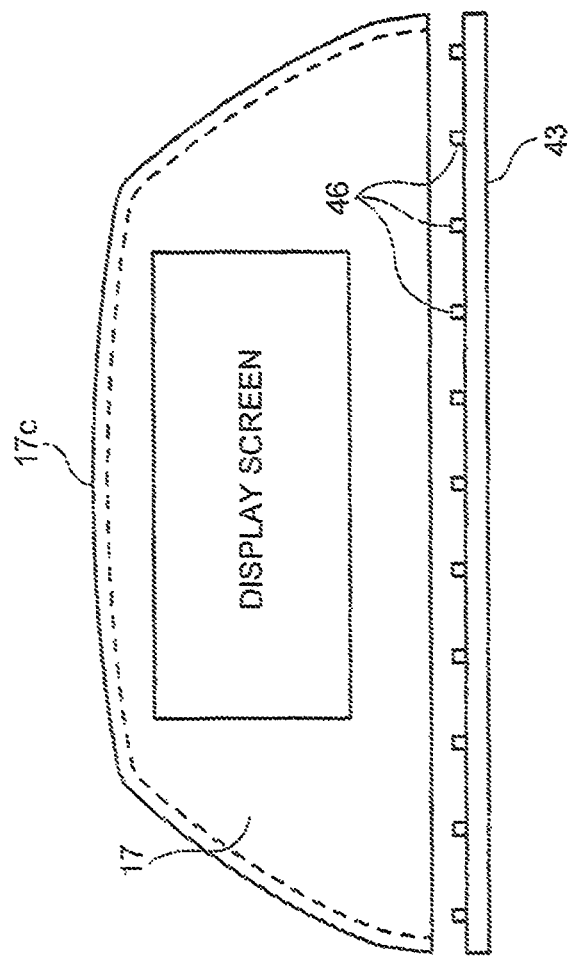

FIG.14
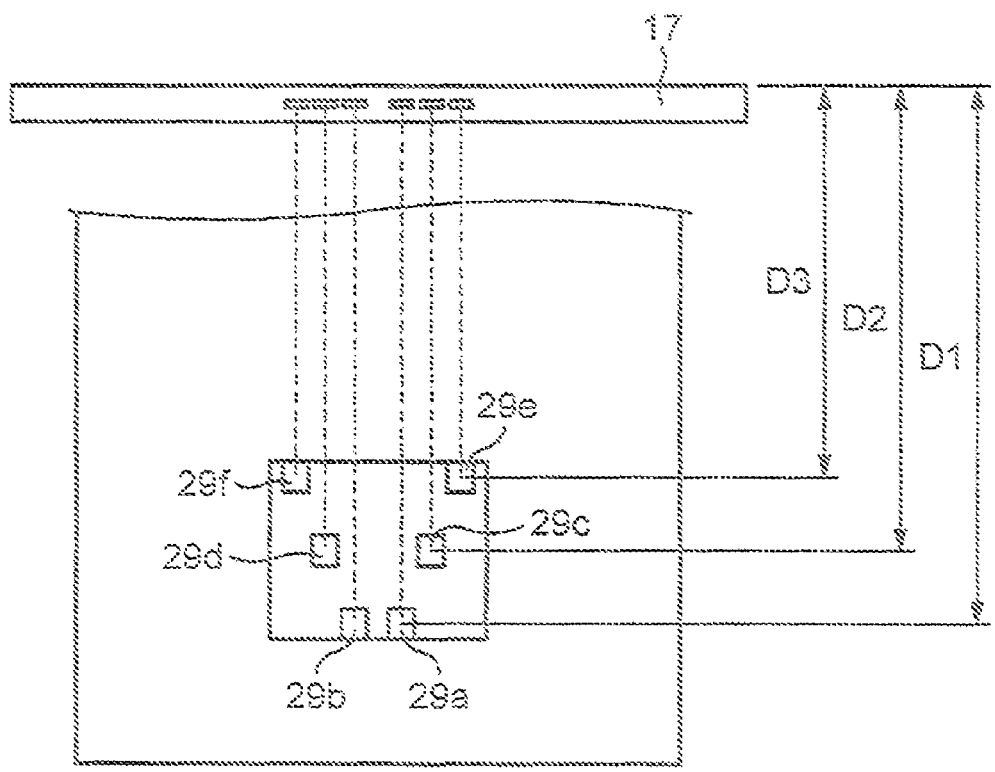
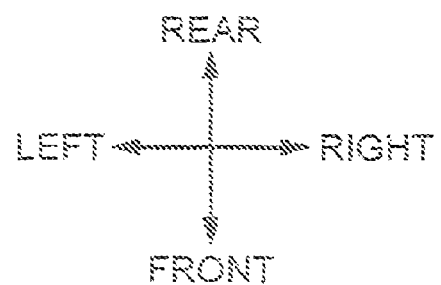

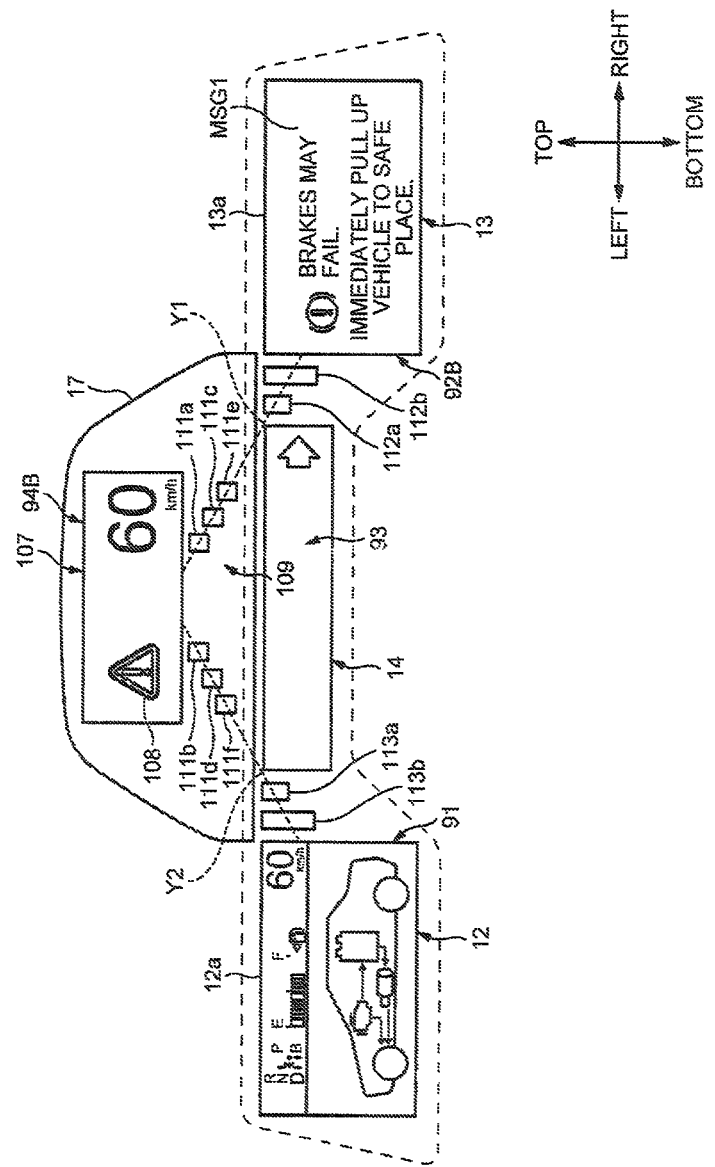

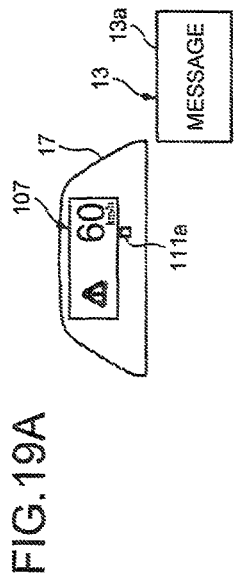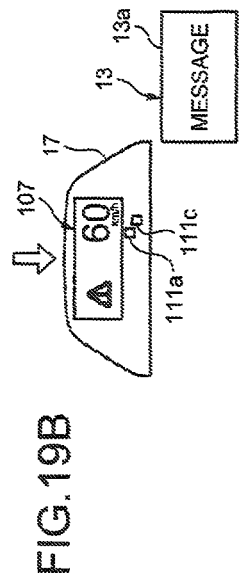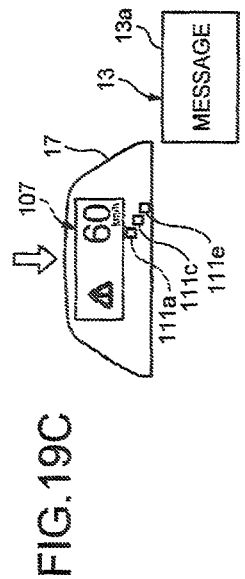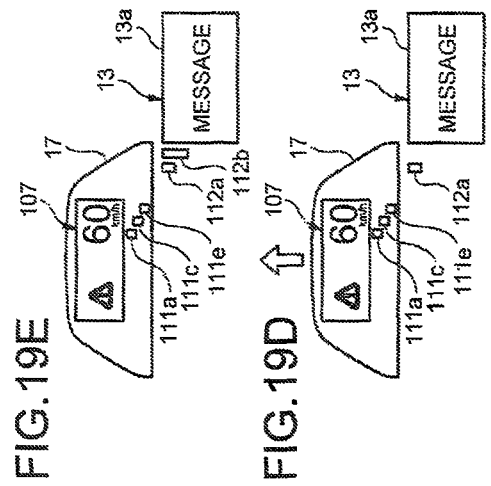

DISPLAY UNIT

CROSS-REFERENCE TO RELATED APPLICATIONS

The present application claims priority to and incorporates by reference the entire contents of Japanese Patent Application No. 2013-144889 filed in Japan on Jul. 10, 2013.

BACKGROUND OF THE INVENTION

1. Field of the Invention

The present invention relates to a display unit and, more particularly, to a technique for guiding the sight line of a driver.

2. Description of the Related Art

Head-up display devices mounted on vehicles are typically configured such that display light emitted from a projection unit is projected onto an optical member (half mirror) called a combiner; and light reflected off a surface of the combiner is reflected in a viewing direction of the driver and guided to a predetermined eye point as a viewing position of the driver (see, for example, Japanese Patent Application Laid-open No. 2006-11122). The combiner is disposed at a position in front of the driver's seat, for example, above the instrument panel, that is easily visually recognizable by the driver. A front windshield, instead of the combiner, may be used as the surface for reflecting the display light.

The head-up display device forms a display image as a virtual image at a position anterior to the combiner in the vehicle forward direction (that is, posterior in the viewing direction). This offers an advantage that the driver requires early small focus adjustment for visually reecognizing the display image. In addition, the head-up display device allows the driver to visually recognize the display image anterior to the combiner in the vehicle forward direction superimposed on a view anterior to the vehicle that is visually recognized through the combiner. The head-up display device can thus present information in a novel mode different from display using an ordinary display panel.

Such a head-up display device can be used for, for example, displaying the vehicle traveling speed. The head-up display device is therefore suitable for displaying highly important information such as vehicle speed, because the driver can visually recognize the speed display with his/her head up and without involving any considerable movement of the sight line or focus adjustment.

The combiner of the head-up display device can display various types of information, but it is not very often that the combiner presents a large amount of information at once. For example, if a malfunction or any other fault occurs in the vehicle, it is often the case that only a warning display containing a symbol such as an exclamation mark (!) is displayed; and a message describing the detail of the fault is not displayed. This is to prevent the field of view of the driver from being interrupted or to prevent the driver from being distracted from the forward view, thereby preventing proper driving by the driver from being hindered.

When a fault occurs, therefore, a message or the like that describes the detail of the fault may be displayed on another display such as a meter unit, in addition to the warning display displayed on the combiner. The combiner and such another display as a meter unit are, however, generally spaced apart from each other in the vertical and horizontal directions (that is, directions perpendicular to the viewing direction). As a result, the driver can fail to notice that such another display as a meter unit displays information for describing the detail of the fault.

In addition, whereas such another display as a meter unit displays information on its display surface, the virtual image displayed by the head-up display device is formed posterior to the combiner in the viewing direction to be visually recognized by the driver. In other words, the image forming position of the display image by the head-up display device is spaced apart in the viewing direction from the display screen of such another display as a meter unit. Here again, the driver can fail to notice that such another display as a meter unit displays information for describing the details of the fault.

To allow the driver to visually recognize such another display as a meter unit while he/she is paying attention to the combiner, the sight line has to be guided from the combiner to such another display as a meter unit.

The present invention has been made in view of the above-described circumstance, and it is an object of the present invention to provide a display unit capable of guiding the sight line of a driver.

SUMMARY OF THE INVENTION

It is an object of the present invention to at least partially solve the problems in the conventional technology.

According to one aspect of the present invention, a display unit includes a controller capable of controlling a display content or a first display area formed in a first device and a display content of a second display area formed in a second device different from the first device; a first light source connected to the controller and configured to display a first guide light between the first display area and the second display area in a viewing direction of the first display arte and the second display area; and a second light source connected to the controller and configured to display a second guide light between the first guide light and the second display area in the viewing direction, wherein the controller, when receiving a signal indicating that an event involving a need to guide a sight line from the first display area to the second display area has occurred, causes the first light source to display the first guide light, and thereafter, causes the second light source to display the second guide light.

According to another aspect of the present invention, the first device is a reflecting plate of a head-up display device, and the second device is a display section of a meter unit.

According to still another aspect of the present invention, the head-up display device includes a projector configured to project display light including a display image onto the reflecting plate, and a first light source configured to project emitted light onto the reflecting plate, the display light from the projector is reflected by the reflecting plate in a viewing direction to define the first display area on the reflecting plate, and the emitted light from the first light source is reflected by the reflecting plate in the viewing direction, causing the first guide light to be displayed on the reflecting plate.

According to still another aspect of the present invention, the meter unit includes a second light source that displays the second guide light.

According to still another aspect of the present invention, the controller is further capable of controlling a display content of a third display area formed in a third device that is different from the first device or the second device, the display unit further comprises: a third light source connected to the controller and configured to display a third guide light between the first display area and the third display area in the viewing direction; and a fourth light source connected to the controller and configured to display a fourth guide light between the third guide light and the third display area in the viewing direction, and the controller, when receiving a signal indicating that an event involving a need to guide the sight line from the first display area to the second display area has occurred, causes the first light source to display the first guide light and then causes the second light source to display the second guide light, and when receiving a signal indicating that an event involving a need to guide the sight line from the first display area to the third display area has occurred, causes the third light source to display the third guide light and then causes the fourth light source to display the fourth guide light.

According to still another aspect of the present invention, the first device is a reflecting plate of a head-up display device, the second device is a first display section of a meter unit, and the third device is a second display section of the meter unit.

According to still another aspect of the present invention, the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

The present invention has been briefly described. The detail of the present invention will be more apparent from the following description of the best mode for carrying out the invention with reference to the accompanying drawings.

BRIEF DESCRIPTION OF THE DRAWINGS

FIG. 9A and 9B are views illustrating the combiner and a combiner illumination substrate, FIG. 9A being a front elevational view and FIG. 9B being a side elevational view;

FIG. 14 is a plan view illustrating the main substrate assembly and the combiner for explaining the optical path of the guide light by using the ambient light source;

FIG. 17 is a front elevational view illustrating an exemplary general display by the display unit under a warning display state;

FIGS. 19A to 19E are explanatory drawings for illustrating changes in a lighting state of each guide light under a warning display state.

DETAILED DESCRIPTION OF THE PREFERRED EMBODIMENTS

A display unit according to a specific preferred embodiment of the present invention will be described below with reference to the accompanying drawings.

[Configuration of Mechanical Section]
[Explanation of Overall Outline]

Figure 1:
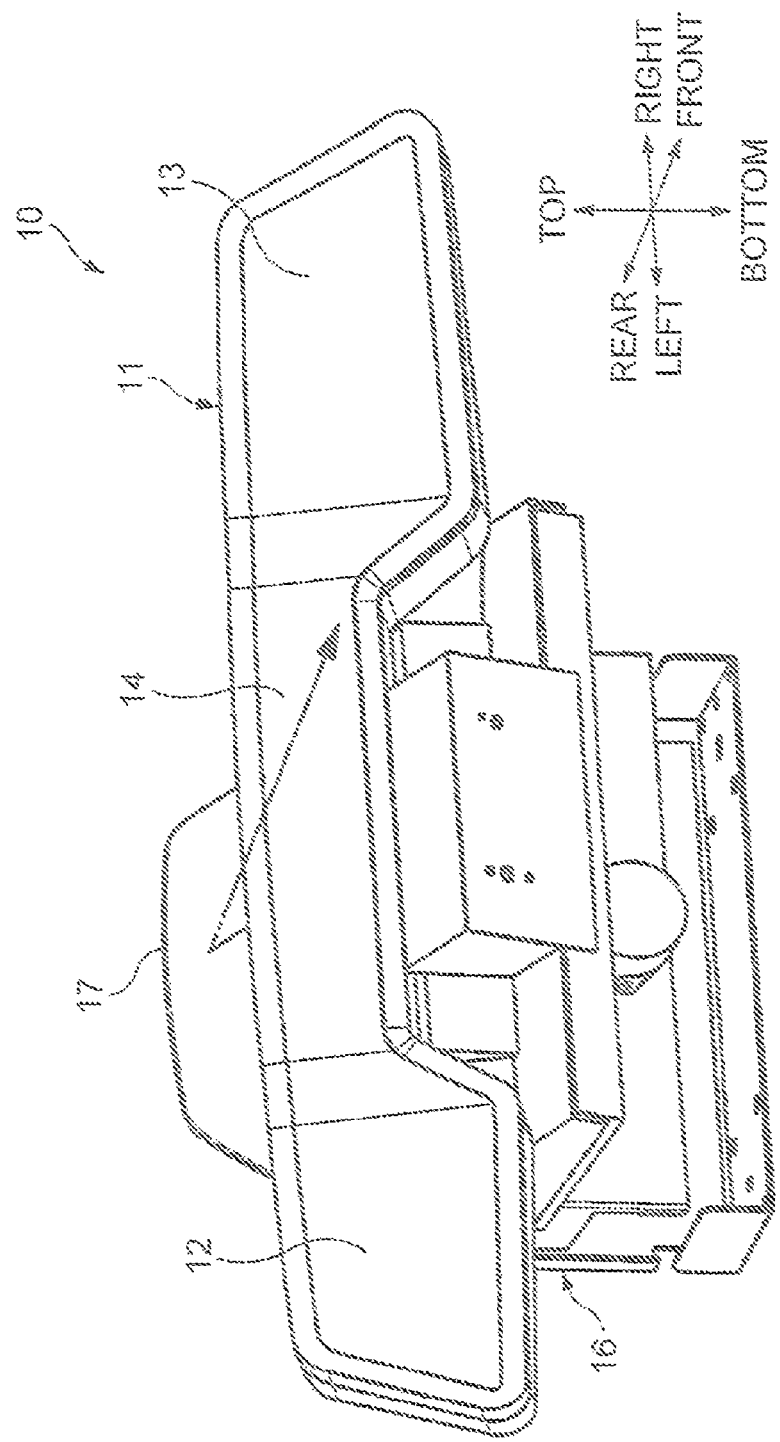
FIG. 1 is a perspective view illustrating the general exterior appearance of a display unit as viewed from the front side.
Figure 2:
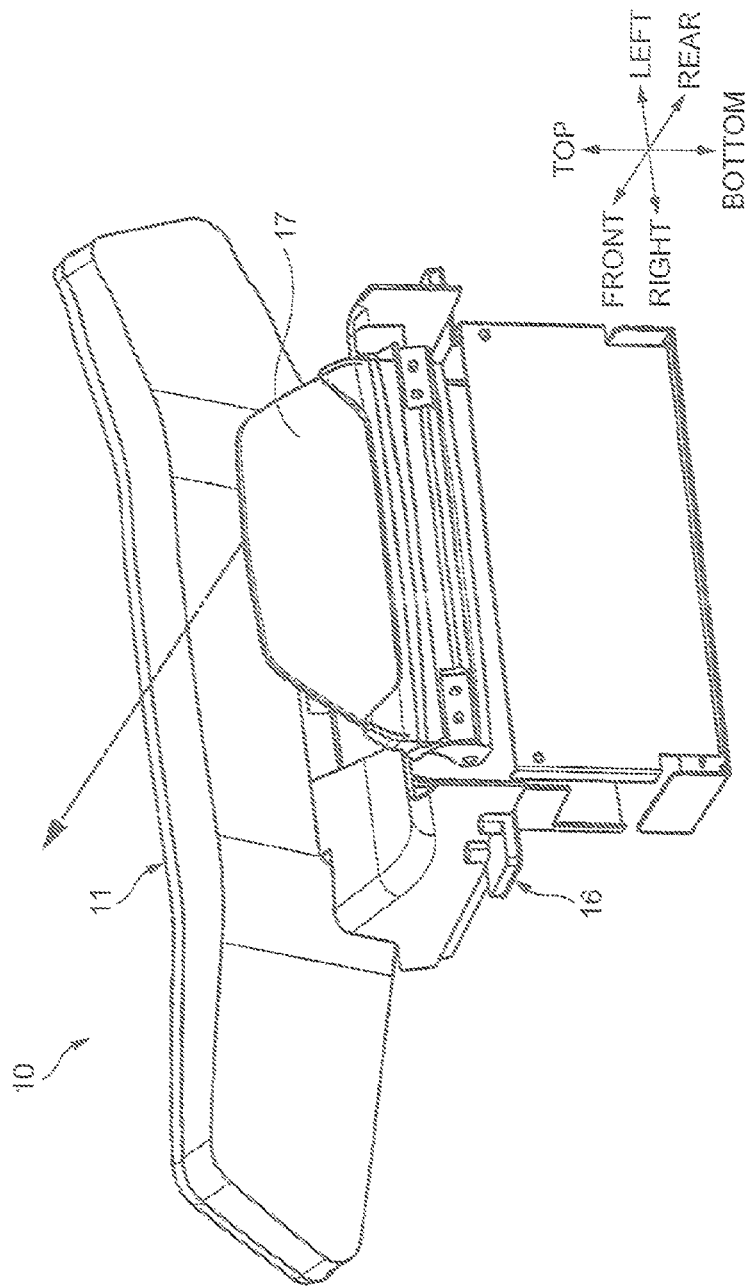
FIG. 2 is a perspective view illustrating the general exterior appearance of the display unit as viewed from a rear side.
Figure 3:
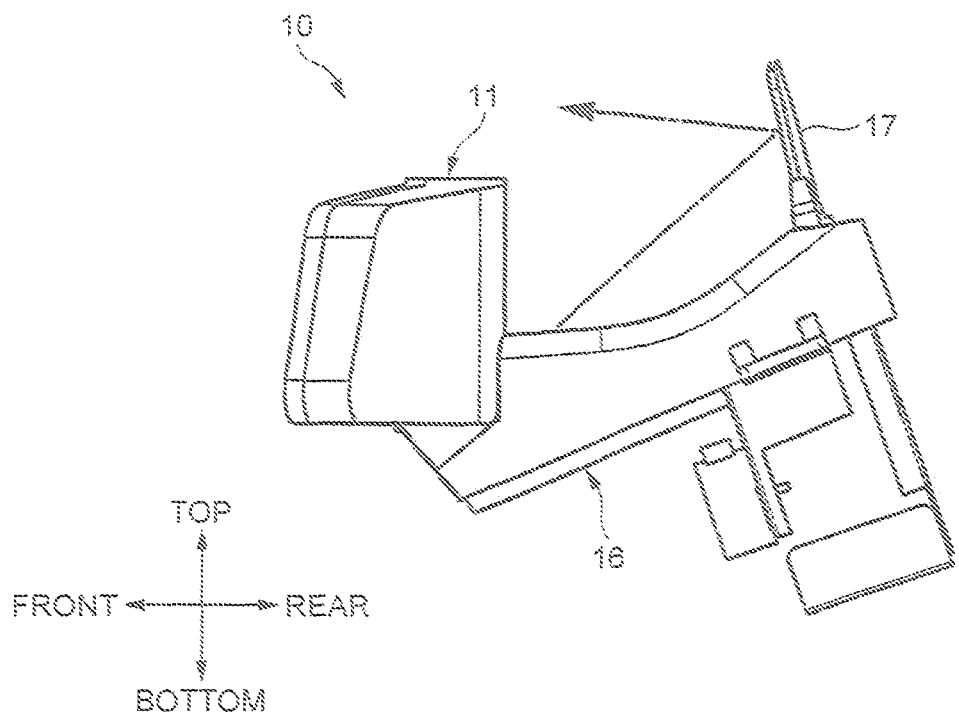
FIG. 3 is a perspective view illustrating the general exterior appearance or the display unit as viewed from a lateral side.
Figure 4:
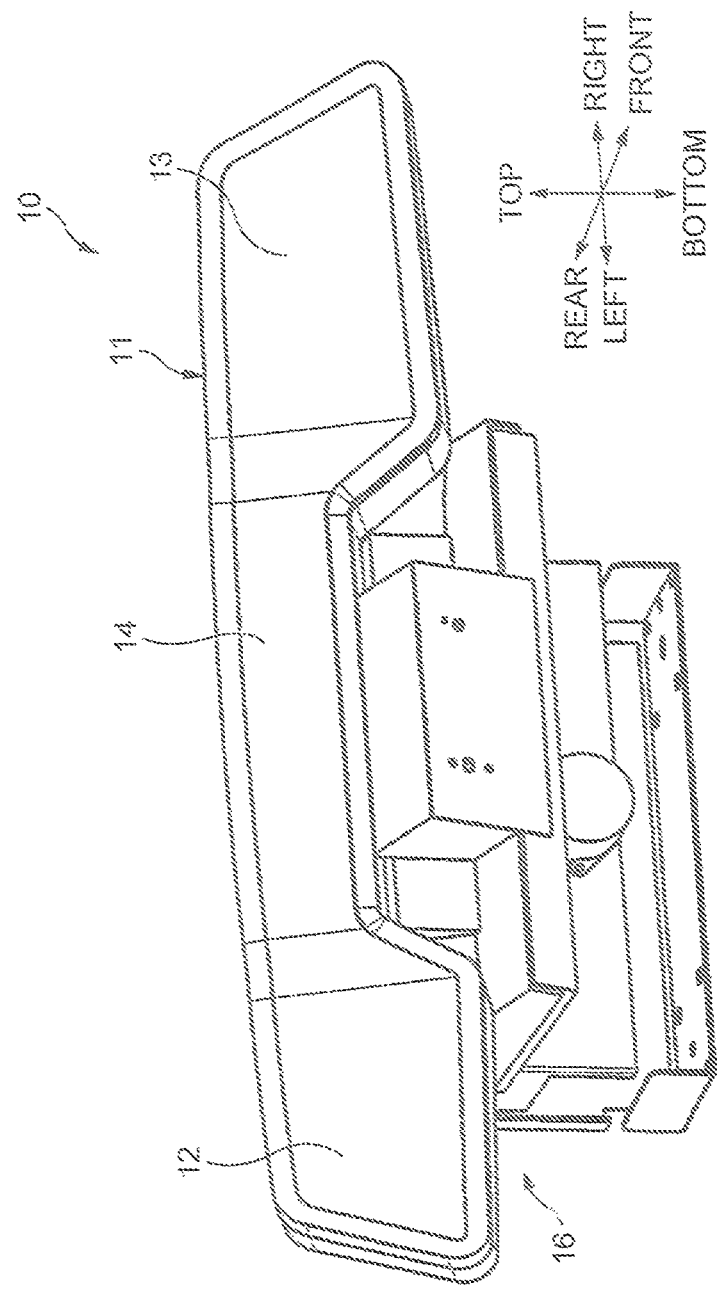
FIG. 4 is a perspective view illustrating the display unit with a combiner stored therein as viewed from the front side.
Figure 5:
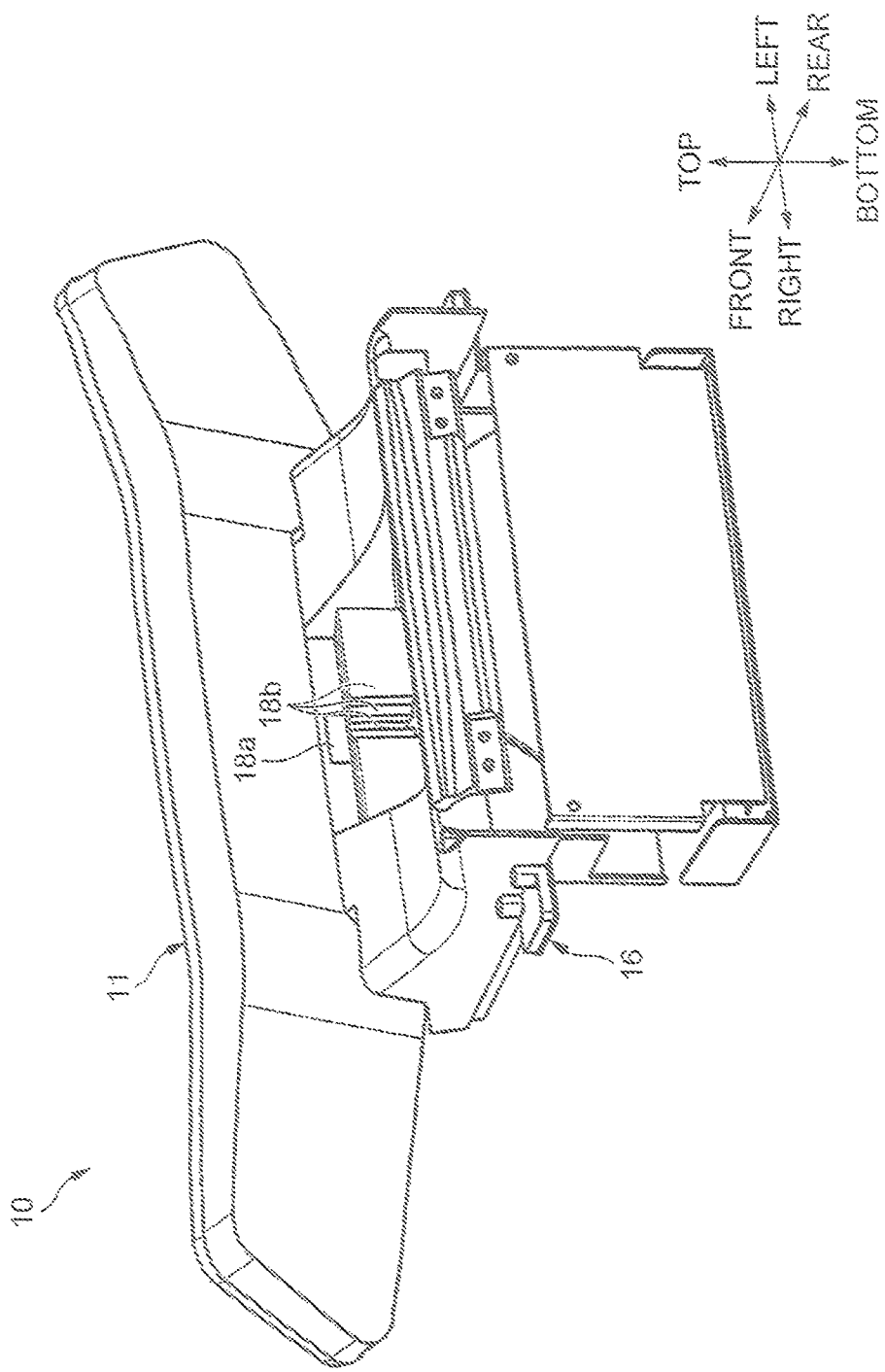
FIG. 5 is a perspective view illustrating the display unit with the combiner stored therein as viewed from the rear side.
Figure 6:
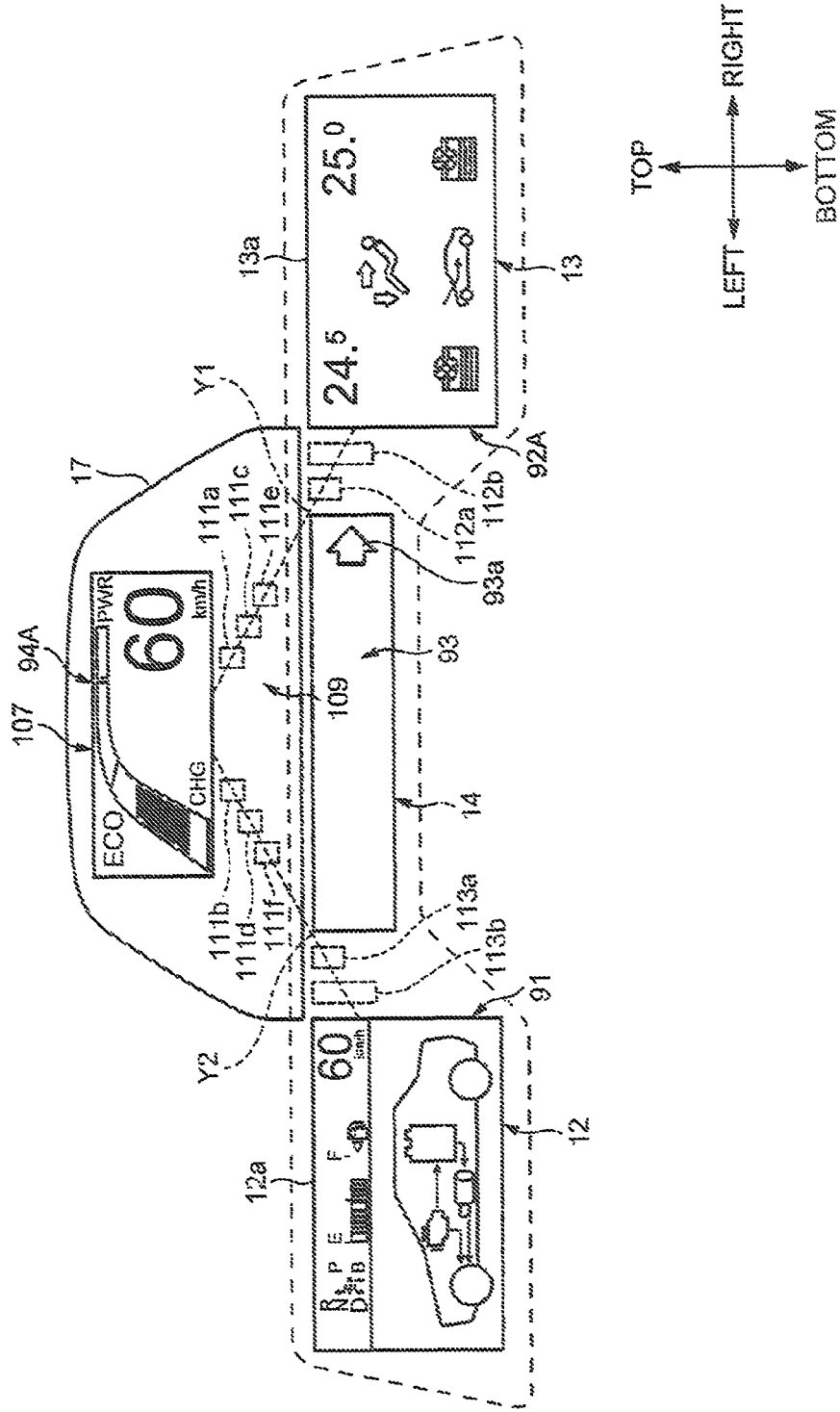
FIG. 6 is a front elevational view illustrating an exemplary general display by the display unit under a normal driving state.

FIGS. 1 to 3 are perspective views illustrating the general exterior appearance of a display unit 10, FIG. 1 illustrating the display unit 10 as viewed from a front side, FIG. 2 illustrating the display unit 10 as viewed from a rear side, and FIG. 3 illustrating one display unit 10 as viewed from a lateral side. FIGS. 1 to 3 illustrate a use condition in which a combiner 17 protrudes from a housing. FIGS. 4 and 5 are perspective views illustrating the display unit 10 in a storing position in which the combiner 17 is stored inside the housing, FIG. 4 illustrating the display unit 10 as viewed from the front side and FIG. 5 illustrating the display unit 10 as viewed from the rear side. FIG. 6 is a front elevational view illustrating an exemplary general display by the display unit 10 under a normal driving state.

In FIGS. 1 to 6, the directional expressions of "left" and "right" correspond to the left and right of the display unit 10, disposed in front of driver's seat of a vehicle, as viewed from the driver's seat. In FIGS. 1 to 6, the directional expressions of "front" and "rear" correspond to the front and rear directions of the display unit 10. Specifically, "front" refers to a direction in which the display unit 10 faces the driver sitting in the driver's seat, end "rear" refers to the rear side of the display unit 10 as viewed from the driver. Additionally, in FIGS. 1 to 6, the directional expressions of "top" and "bottom" correspond to the vertical direction of the vehicle. The drawings to be later referred to other than FIGS. 1 to 6 also use the directional expressions of "left", "right", "front", "rear", "top", and "bottom" in the same manner.

The display unit 10 illustrated in FIGS. 1 to 6 includes a meter unit 11 integrated with a head-up display (HUD) device 16. The display unit 10 is embedded inside the instrument panel (not illustrated) of the vehicle with a part thereof exposed on the outside of the instrument panel so as to be visually recognized by the driver. More specifically, the display unit 10 is disposed such that the combiner 17 of the HUD device 16 in the use position protrudes from the instrument panel and in the stored position is stored in a position lower than the instrument panel. Specifically, the combiner 17 is visually recognizable by the driver in the use position and is not visually recognized by the driver in the stored position. As will be later described, an HUD display area (a first display area) 107 and an ambient display area 109 are defined on the combiner 17 (see FIG. 6).

As illustrated in FIGS. 1 to 3, the meter unit 11 includes two display sections, a left side display 12 and a right side display 13. As illustrated in FIG. 1, the left side display 12 is disposed on the left side of the meter unit 11, and the right side display 13 is disposed on the right side of the meter unit 11. The meter unit 11 further includes a center display 14 between the left side display 12 and the right side display 13, the center display 14 capable of displaying a display light for warning or other purposes. These elements will be described in detail later. The meter unit 11 including these display sections is used, similar to ordinary vehicular meter units, for displaying various types of information useful for vehicle driving. The meter unit 11 displays, for example, a speedometer that displays the traveling speed of the vehicle and an odometer that displays the travel distance of the vehicle. The meter unit 11 also displays, for example, an indicator that indicates the shift position of a transmission lever, a fuel gauge that indicates a level of fuel still available, and a warning display that warns of any fault. A liquid crystal display panel capable of giving a graphic display is used for each of the left side display 12 and the right side display 13 of the meter unit 11, so that the left side display is and the right side display 13 can display, for example, an image (video image) captured by an in-vehicle camera. That is, the left side display 12 and the right side display 13 each have a display area defined thereon. A display area of the right side display 13 will hereinafter be referred to as a second display area 13a, and a display area of the left side display 12 will hereinafter be referred to as a third display area 12a (see FIG. 6).

The HUD device 16 displays various types of information by projecting a display image onto the plate-shaped combiner 17 as a translucent reflecting plate (half mirror). The combiner 17 in the use position protrudes upwardly from the center display 14, as illustrated in FIGS. 1 to 3. This allows the driver, when a display image is displayed on the combiner 17, to visually recognize the display image without moving the sight line in a large amount from a normal driving position. In addition, the HUD device 16 forms the display image as a virtual image at a position farther in the "rear" direction than the combiner 17. This requires only small focus adjustment for the driver to visually recognize the display. Thus, the HUD device 16 can offer a highly visible display function requiring only a small movement of the sight line and only small focus adjustment for the driver. In addition, the HUD device 16 allows the driver to visually recognize the display image displayed on the combiner 17 superimposed on a view anterior to the vehicle that is visually recognized through the combiner 17. The HUD device 16 can thus present information in a mode different from display using an ordinary display panel.

FIG. 6 is a front elevational view illustrating an exemplary general display by the display unit under the normal driving state. As illustrated in FIG. 6, the combiner 17 (a first device) above the center display 14 displays, on the HUD display area 107 (the first display area), information having higher priority such as the current vehicle speed (letters or numerals such as 60 km/h) and an index indicating an ecology degree of driving, in a large, easy-to-view format, as an HUD display content 94A. The left side display 12 (a second display section, a third device) is disposed on a lower-left side of the combiner 17. The left side display 12 has a third display area 12a on which, for example, a display element indicating the condition of a hybrid system, a speedometer, a fuel gauge, and the shift position of a transmission are displayed as a left screen display content 91. The right side display 13 (a first display section, a second device) is disposed on a lower-right, side of the combiner 17. The right side display 13 has s second display area 13a on which, for example, a display element indicating the condition of air conditioning is displayed as a right screen display content 92A. The center display 14 displays a central display content 93. For example, a right turn display 93a that will flash to inform the driver that a corresponding direction indicator is flashing.

Although FIG. 6 illustrates a condition in which each of guide lights 111a to 111f to be described later is not displayed, the combiner 17 is configured to display a plurality of guide lights 111a to 111f at positions indicated by the broken lines in FIG. 6. The guide lights 111a to 111f can be displayed on the ambient display area 109. In addition, guide lights 112a, 112b can be displayed in a middle position between the right side display 13 of the meter unit 11 and the combiner 17; and guide lights 113a, 113b can be displayed in a middle position between the left side display 12 of the meter unit 11 and the combiner 17. In the display unit 10 according to the embodiment, each of these guide lights is used to guide the sight line of the driver. Processing for guiding the sight line will be described later.

[Explanation of Detailed Configurations of Respective Units]

Figure 7:
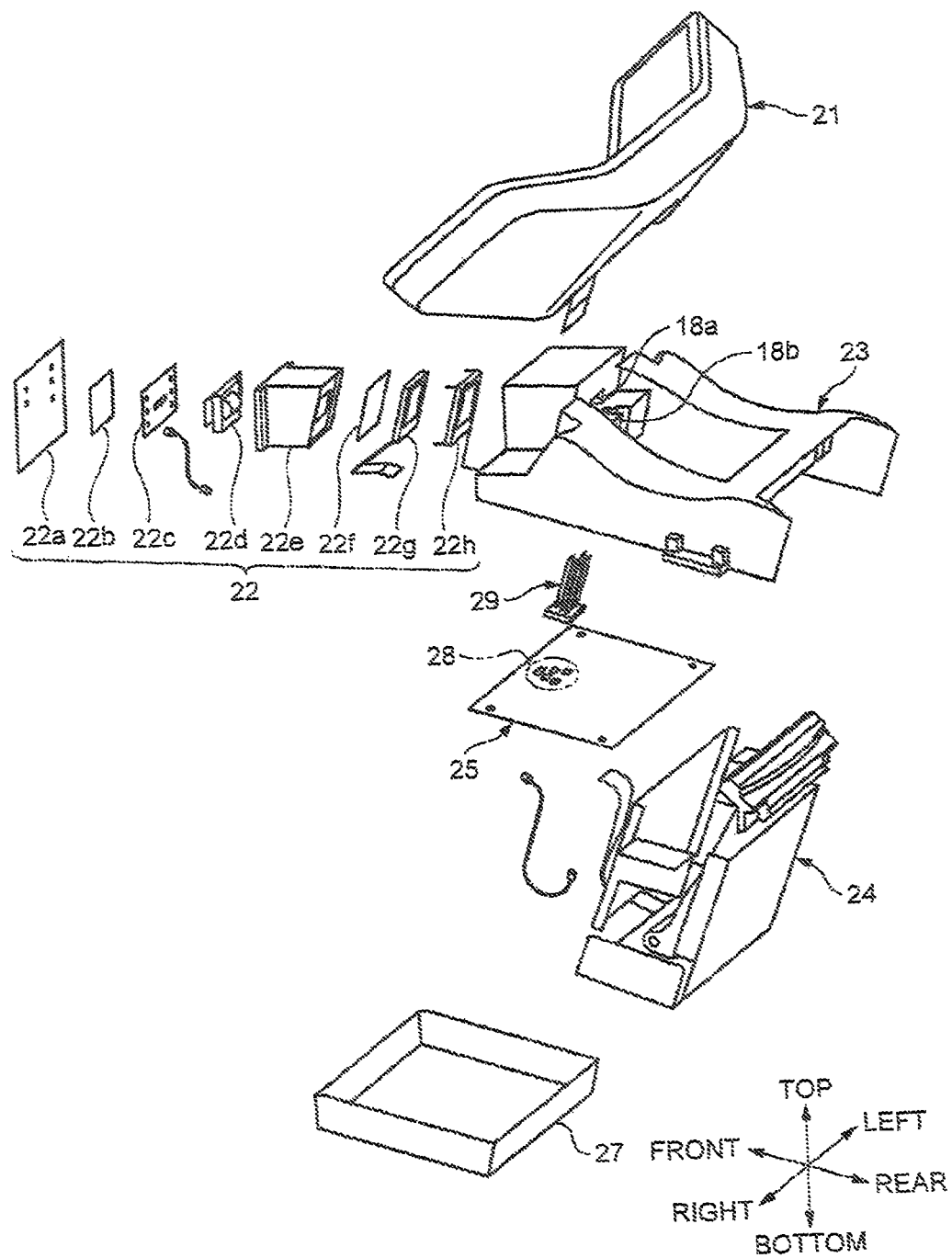
FIG. 7 is an exploded perspective view schematically illustrating the general configuration of the display unit.

FIG. 7 illustrates the display unit 10 disassembled into main components.

As illustrated in FIG. 7, the display unit 10 includes a meter subassembly 21, a display-light projector 22, a projector case 23, a driving unit assembly 24, a main substrate assembly 25, a cover 27, an ambient light source 28, and an ambient prism unit 29.

[Explanation of Display-Light Projector 22]

The display-light projector 22 can project display light including a display image to be displayed by the HUD device 16 onto the combiner 17.

As illustrated in FIG. 7, the display-light projector 22 includes a heat sink 22a, a heat conducting sheet 22b, a backlight substrate 22c, a lens array 22d, a backlight case 22e, a diffusion sheet 22f, a liquid crystal display 22g, and a shield case 22h that are arranged in this sequence from the rear side.

The liquid crystal display 22g includes a plurality of display pixels arranged two-dimensionally. The pixels can be individually controlled for, for example, turning on or off the display and display colors. This allows the liquid crystal display 22g to display any type of visible information, such as graphics, characters, and images, on a screen.

The liquid crystal display 22g is a transparent liquid crystal display panel. Illuminated from its back side by a backlight on the backlight substrate 22c, the liquid crystal display 22g can project display light including the display image to be displayed on the screen. The display light is projected onto the combiner 17 through a display light emitting port 18a that is an opening formed in the projector case 23 as illustrated in FIGS. 5 and 7 (see also FIG. 12 to be referred to later).

The combiner 17 is incorporated in the driving unit assembly 24 and supported so as to be vertically movable. With the HUD device 16 in a display condition, the combiner 17 moves to a position at which the combiner 17 protrudes from the driving unit assembly 24 to reflect the display light emitted from the display-light projector 22. The Light reflected off a reflecting surface of the combiner 17 is then directed toward a predetermined eye point corresponding to the position of the driver's eye. That is, the light reflected off the reflecting surface of the combiner 17 travels in the viewing direction of the driver. This allows the driver to visually recognize visible information displayed on the screen of the liquid crystal display 22g as a virtual image imaged on the combiner 17.

[Explanation of Outline of Ambient Light Display]

In the present embodiment, any light other than the display image of the liquid crystal display 22g can also be projected onto and displayed on a surface of the combiner 17 as a virtual image. For this purpose, the ambient light source 28 is disposed on the main substrate assembly 25. In addition, the ambient prism unit 29 is disposed so as to face the ambient light source 28. The ambient light source 28 includes a plurality of light emitting diodes (LEDs). The ambient prism unit 29 includes a plurality of prisms, each being disposed so as to face a corresponding one of the light emitting diodes.

Light emitted from the ambient light source 28 enters the ambient prism unit 29 from below to be reflected off a surface near the top, and is projected onto the combiner 17 through an ambient light emitting port 18b (see FIGS. 5 and 7) formed in the projector case 23. This ambient light is also reflected off the reflecting surface of the combiner 17 and travels in the viewing direction of the driver. Thus, when the ambient light source 23 emits light, the driver can also visually recognize the ambient light as a virtual image imaged on the combiner 17.

In the present embodiment, a plurality of ambient light can be three-dimensionally displayed using a difference in optical path lengths. This ambient light display approach allows each of the guide lights 111a to 111f to be displayed on the combiner 17 illustrated in FIG. 6. The detail of this structure will be described later.

[Explanation of Meter Assembly 21]

Figure 8:
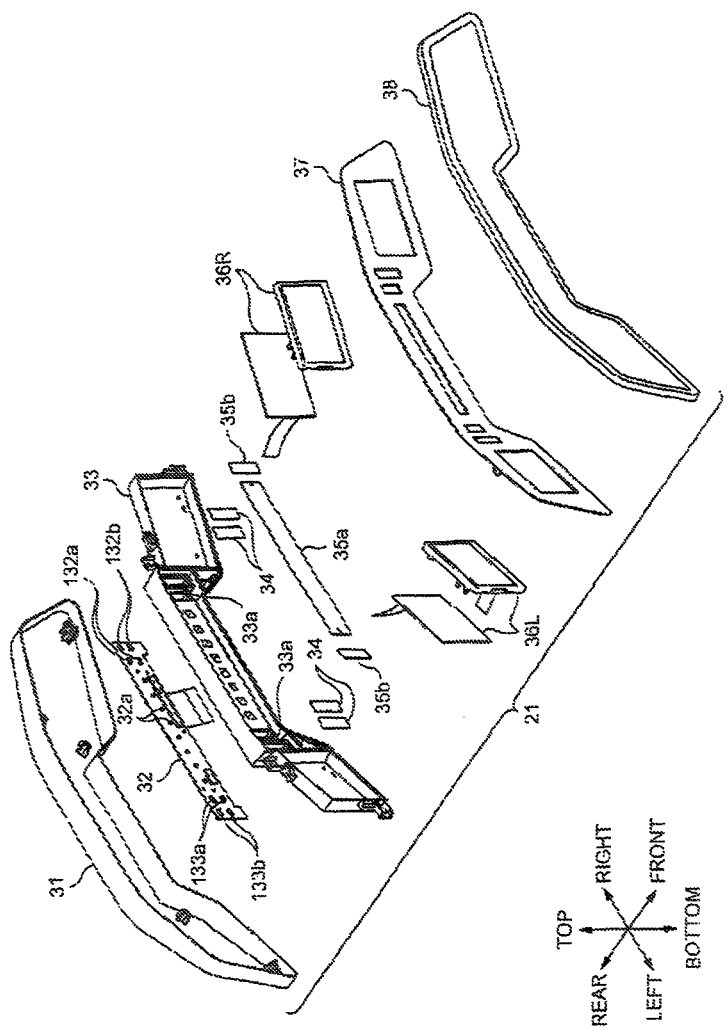
FIG. 8 is an exploded perspective view illustrating the configuration of a meter subassembly.

The meter unit 11 includes a main body as the meter subassembly 21. FIG. 8 is an exploded perspective view illustrating the meter subassembly 21 separated into main components.

As illustrated in FIG. 8, the meter subassembly 21 includes a rear cover 31, a substrate 32, a case 33, a plurality of diffusion sheets 34, telltale lenses 35a, 35b, a meter left display 36L, a meter right display 36R, a facing plate 37, and a front glass 38 that are arranged in this sequence from the rear side.

The substrate 32 has a rectangular shape extending laterally. Light emitters 132a, 132b are disposed near the right end of the substrate 32, and light emitters 133a, 133b are disposed near the left end of the substrate 32. The light emitters 132b, 133b are disposed outside the light emitters 132a, 133a, respectively. Additionally, light emitters 32a are laterally juxtaposed between the light emitters 132a, 132b and the light emitters 133a, 133b. Each of these light emitters includes a plurality of independent light emitting diodes. In addition, each of these light emitters includes a pair of a light emitting diode that emits red light and a light emitting diode that emits green light.

Light emitted from each of the light emitters travels toward the "fronts", passing through in sequence an aperture in the case 33, the diffusion sheets 34, the telltale lenses 35a, 35b, and an aperture in the facing plate 37 and appearing as display light for, for example, various types of warnings on the surface of the front glass 38. Display light from a light emitter 32c is displayed on the center display 14 described earlier to be visually recognized by the driver as a telltale display. The front glass 38 is smoked to be translucent.

Lighting the light emitter 132a can display the guide light 112a described with reference to FIG. 6. Lighting the light emitter 132b can display the guide light 112b. Similarly, lighting the light emitter 133a can display the guide light 113a, and lighting the light emitters 133b can display the guide light 113b.

As illustrated in FIG. 8, the diffusion sheets 34 are disposed at positions at which light emitted from the light emitters is diffused. In addition, the diffusion sheets 34 corresponding to the light emitters 132a, 133a are disposed at positions different in the front-rear direction from positions at which the diffusion sheets 34 corresponding to the light emitters 132b, 133b are disposed. Specifically, shoulders 33a are formed in the case 33, so that the diffusion sheets 34 corresponding to the light emitters 132b, 133b are disposed anterior to the diffusion sheets 34 corresponding to the light emitters 132a, 133a. This allows the driver to visually recognize the guide lights 112a, 113a displayed by the light emitted from the light emitters 132a, 133a as if they were lit posterior to the guide lights 112b, 113b displayed by the light emitted from the right emitters 132b, 133b.

The meter left display 36L and the meter right display 36R are each an independent color liquid crystal display panel that includes a plurality of display pixels arranged two-dimensionally. The pixels of the meter left display 36L and the meter right display 33R can be individually controlled for, for example, turning on or off the display and display colors. This allows the meter left display 36L and the meter right display 36R to display any type of visible information, such as graphics, characters, and images, on a screen.

A display content on the screen of each of the meter left display 36L and the meter right display 36R pass through the aperture in the facing plate 37 and are displayed on the surface of the front glass 38. The display content of the meter left display 36L is displayed on the left side display 12 described earlier to be visually recognized by the driver, and the display content of the meter right display 36R is displayed on the right side display 13 to be visually recognized by the driver.

[Configuration Near Combiner]

Figure 10:
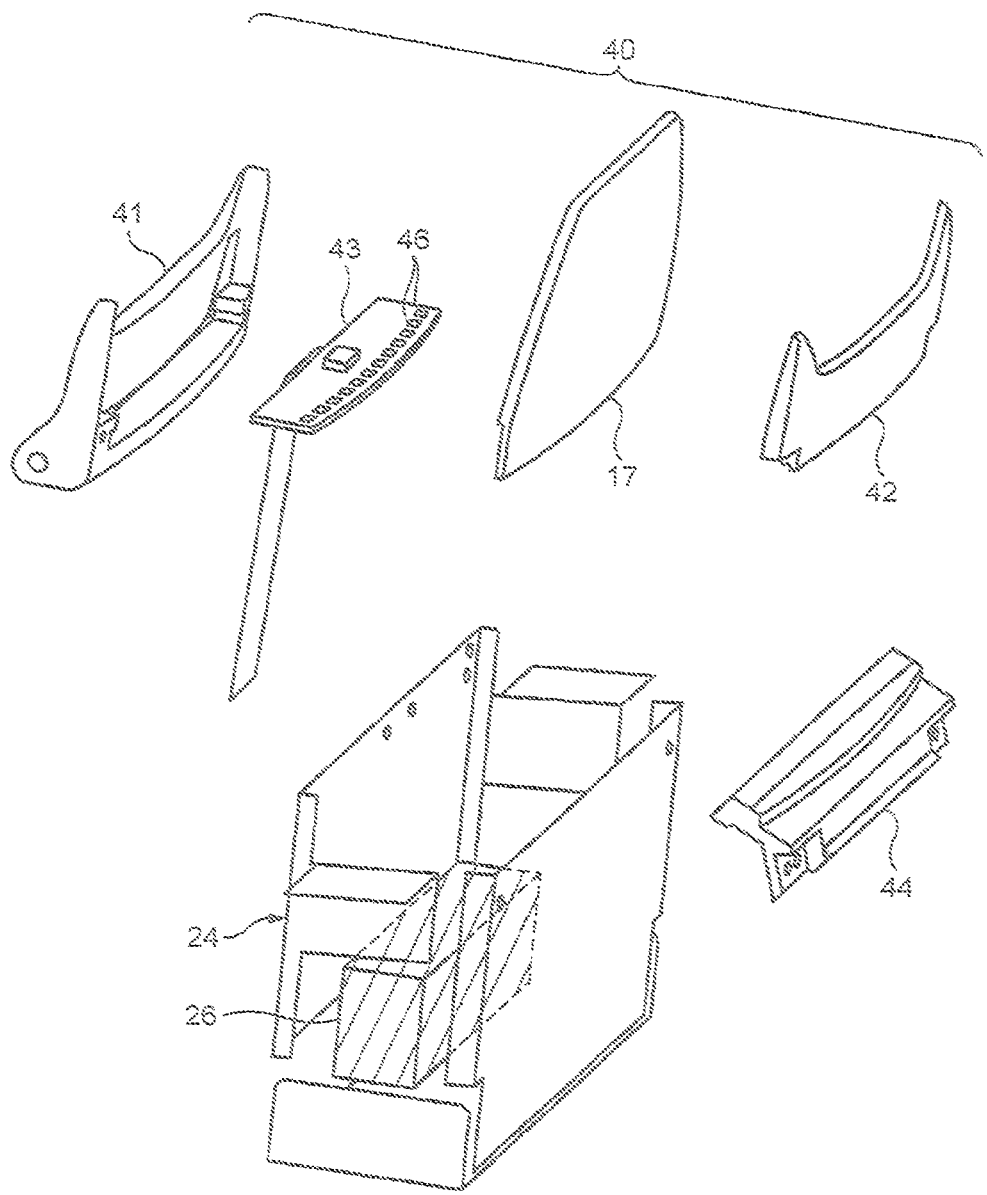
FIG. 10 is an exploded perspective view illustrating the configuration of a driving unit subassembly.

FIGS 9A and 9B illustrate the combiner 17 and a combiner illumination substrate 43, FIG. 9A being a front elevational view and FIG. 9B being a side elevational view. FIG. 10 is an exploded perspective view illustrating main components of a driving unit subassembly 40 housed in the driving unit assembly 24.

As illustrated in FIG. 10, the driving unit subassembly 40 includes the combiner 17, a front combiner holder 41, a rear combiner holder 42, and the combiner illumination substrate 43. Specifically, the combiner 17 is disposed between the front combiner holder 41 and the rear combiner holder 42 to be integrally held with the holders.

The combiner illumination substrate 43 having a thin sheet shape is disposed at a position to support the lower end of the combiner 17. An end face light source 46 is disposed on the upper surface of the combiner illumination substrate 43. The end face light source 46 includes a plurality of light emitting diodes that are arrayed laterally in a row.

Thus, as illustrated in FIGS. 9A, 9B, and 10, the end face light source 46 on the combiner illumination substrate 43 is disposed to face the lower end face of the combiner 17. The lower end face of the combiner 17 has an illumination light entering part 17a formed therein that, guides illumination light from the end face light source 46 to the inside of the combiner 17. In addition, an illumination light reflecting part 17c is formed on the upper and face and lateral end faces of the combiner 17 in the directions orthogonal to the thickness direction of the combiner 17. As illustrated in FIGS. 9A and 9B, in the present embodiment, the illumination light reflecting part 17c on the upper end face is formed into a slope inclined so as to be spaced further apart from the combiner illumination substrate 43. The illumination light reflecting part 17c on the lateral end faces is a slope inclined so as to expand outwardly in a circumferential direction toward the front. The slope on the end portions of the combiner 17 reflects the illumination light from the end face light source 46 toward the front. It is noted that the illumination light reflecting part 17c of the combiner 17 may be formed to cover the entire upper and lateral end faces as in the present embodiment or formed on a part of the end faces. For example, the illumination light reflecting part 17c may be formed on the upper end face and either one of the lateral end faces.

The following describes paths of display light protected from the display-light projector 22 and illumination light emitted from the end face light source 46.

The display light projected from the display-light projector 22 passes through the display light emitting port 18a and enters a display light reflecting surface 17b that is a surface on one side (front side) in the thickness direction of the combiner 17. The display light is then reflected off the display light reflecting surface 17b and directed toward the predetermined eye point that corresponds to the position of the driver's eye. This allows the driver to visually recognize a display image included in the display light.

When the end face light source 46 illuminates, the illumination light from the end face light source 46 is guided to the inside of the combiner 17 through the illumination light entering part 17a. The illumination light then transmits through the combiner 17 and is reflected off the surface of the illumination light reflecting part 17c to reach the eye point as illustrated in FIG. 9B. This allows true driver to visually recognize the end of the combiner 17 illuminated in a band as illustrated in FIG. 9A. As described above, the HUD device 16 of the display unit 10 can illuminate the end faces of the combiner 17, thereby achieving a novel visual effect as compared with a known unit projecting the display image only on the surface of the combiner 17.

The driving unit subassembly 40 illustrated in FIG. 10 is housed in the driving unit assembly 24 and connected to a drive mechanism 26. The drive mechanism 26 can vertically move, with its driving force, the driving unit subassembly 40 including the combiner 17. The drive mechanism 26 can thus position the combiner 17 in the stored position in which the entire combiner 17 is stored inside the driving unit assembly 24 and in the use position in which the combiner 17 protrudes upwardly from the instrument panel. With the combiner 17 in the stored position, an instrument panel cover 44 illustrated in FIG. 10 covers an opening of the instrument panel.

[Detailed Explanation of Ambient Light Display]

Figure 11:
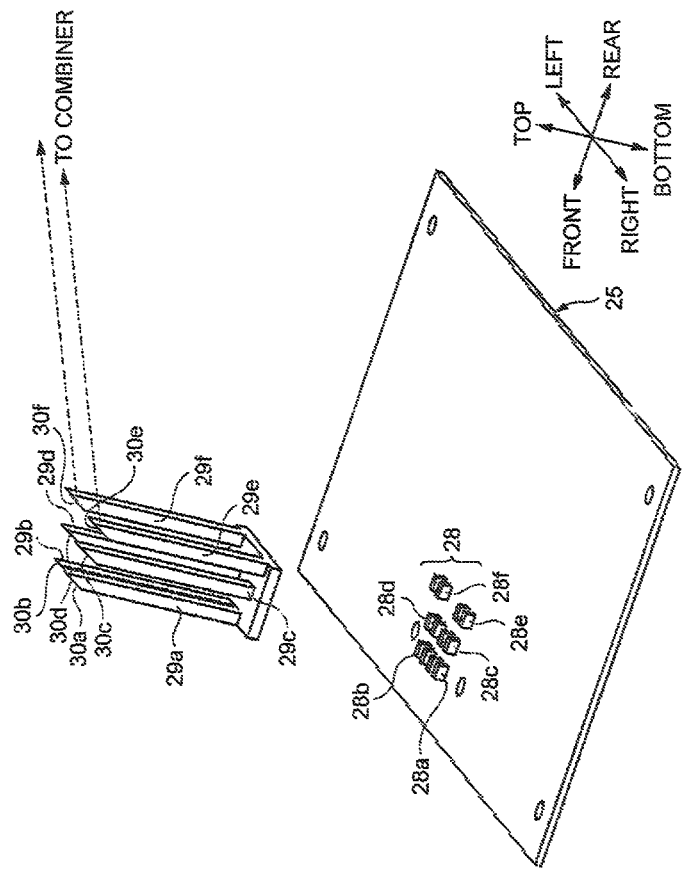
FIG. 11 is an enlarged view illustrating a main substrate assembly.
Figure 12:
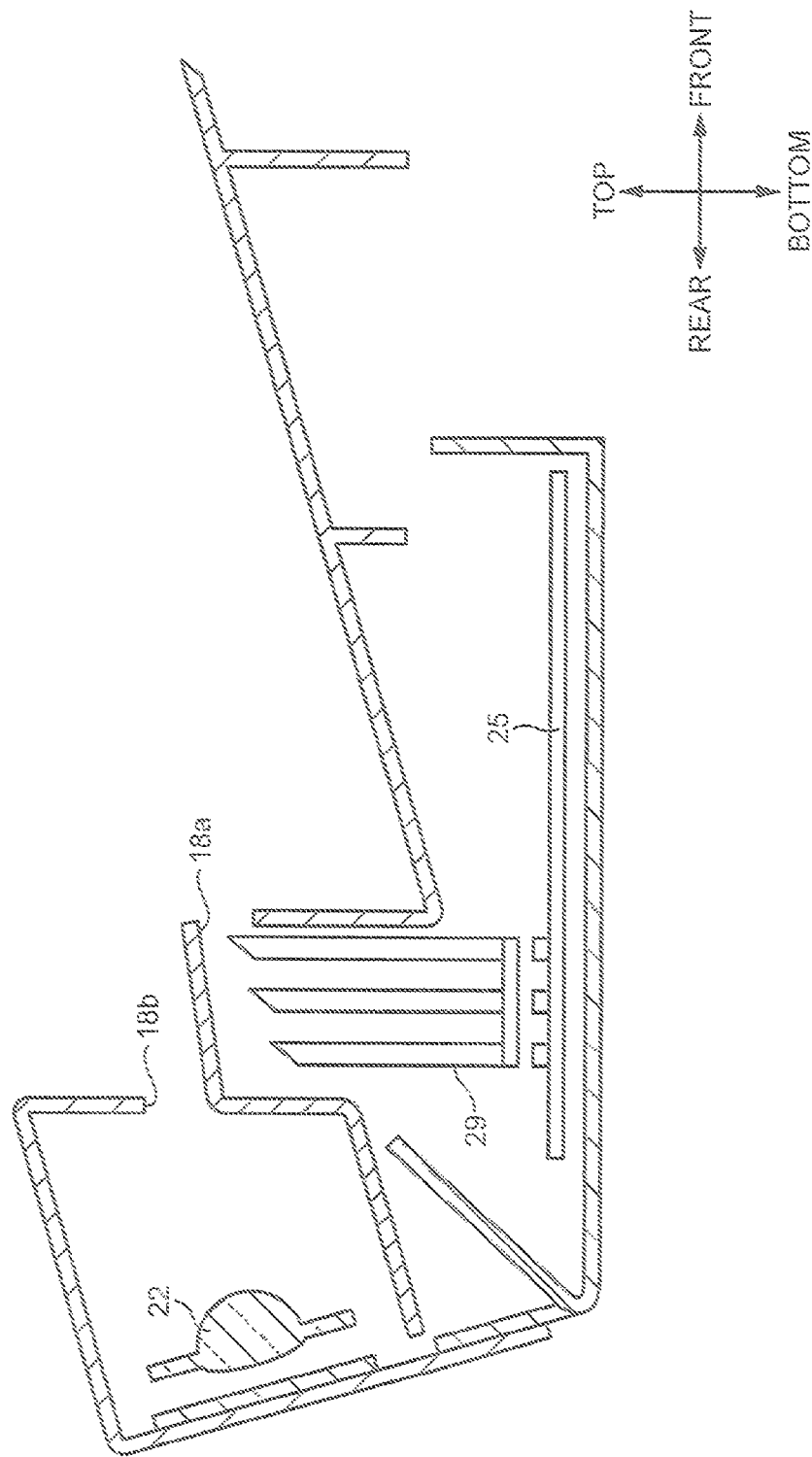
FIG. 12 is a side elevational view illustrating the main substrate assembly for explaining the disposition or parts of the main substrate assembly.
Figure 13:
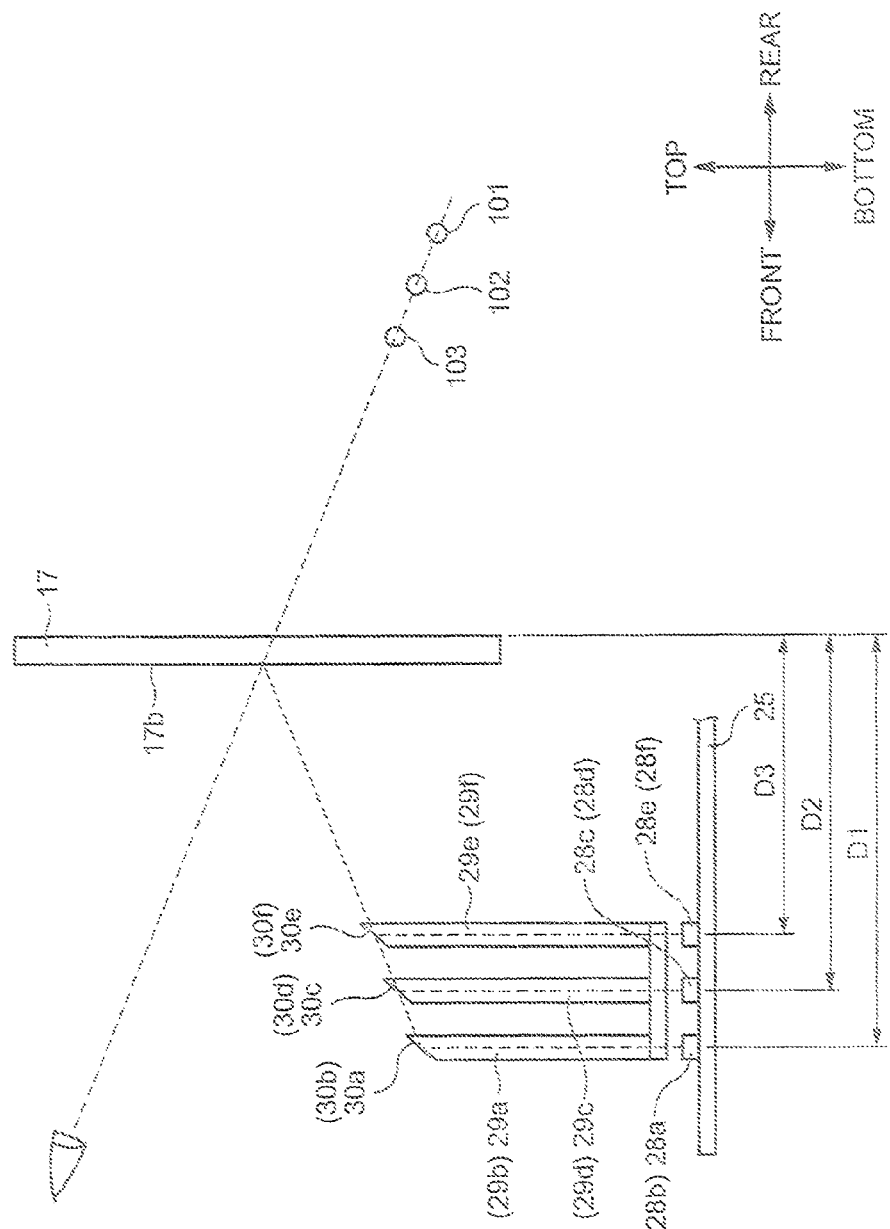
FIG. 13 is a side elevational view illustrating lure main substrate assembly and the combiner for explaining an optical path of a guide light by using an ambient light source.

FIG. 11 is an enlarged view illustrating the main substrate assembly. FIGS. 12 to 14 are explanatory drawings, FIG. 12 being a side elevational view illustrating the main substrate assembly, FIGS. 13 and 14 being a side elevational view and a plan view, respectively, illustrating the main substrate assembly and the combiner.

As illustrated in FIG. 11, the ambient prism unit 29 includes six prisms 29a, 29b, 29c, 29d, 29e, and 29f that are disposed at positions different from each other in a plane of the main substrate assembly 25. The six prisms extend vertically, having one end in the longitudinal direction connected to be generally integrated with each other. Each of the prisms 29a, 29b, 29c, 29d, 29e, 29f has the other end (near its apex) pointed sharply to define respective reflecting surfaces 30a, 30b, 30c, 30d, 30e, and 30f that reflect light emitted from the ambient light source 28 to be described later toward the combiner 17.

In the present embodiment, the prisms 29a, 29b adjacent laterally to each other are paired up, the prisms 29c, 29d adjacent laterally to each other are paired up, and the prisms 29e, 29f adjacent laterally to each other are paired up. As illustrated in FIG. 14, in the lateral direction, the distance between the prisms 29a and 29b is the smallest. The prisms 29c and 29d are disposed outside the prisms 29a and 29b, respectively, end the prisms 29e and 29f are disposed outside the prisms 29c and 29d, respectively. As illustrated in FIG. 14, the pairs of the prisms are juxtaposed laterally with the same lateral center.

As illustrated in FIG. 13, the three pairs of prisms 29a and 29b, 29c and 29d, and 29e and 29f are disposed different positions from each other in the front-rear direction. In the present embodiment, the pair of prisms 29a and 29b, the pair of prisms 29c and 29d, and the pair of prisms 29e and 29f are disposed in this sequence from the side away from the combiner 17 (specifically, from the front side).

The ambient light, source 28 includes six light sources 28a to 28f. As illustrated in FIG. 11, the light sources 28a to 28f are each a pair of a light emitting diode that emits red light and a light emitting diode that emits green light. The six light sources 28a to 28f are disposed at positions facing the lower end faces of the prisms 29a to 29f, as illustrated in FIGS. 11 to 14.

As illustrated in FIG. 13, light emitted from the light source 28a enters and passes through the prism 29a. The light is then reflected off the reflecting surface 30a near the apex of the prism 29a and is directed toward the combiner 17 through the ambient light emitting port 18b illustrated in FIG. 12 (see also FIGS. 5 and 7). The light is reflected off the display light reflecting surface 17b of the combiner 17 in the viewing direction as illustrated in FIG. 13, traveling toward the eye point that corresponds to the position of the driver's eye. In this case, the image viewed by the driver is visually recognized through the combiner 17 as a virtual image 101 positioned ahead of the combiner 17.

Similarly, light emitted from the light source 28c enters and passes through the prism 29c and is reflected off the reflecting surface near the apex of the prism 29c to be directed toward, the combiner 17. This light is reflected off the combiner 17 in the viewing direction end directed toward the eye point to be visually recognized as a virtual image 102 by the driver. Similarly, light emitted from the light source 28e enters and passes through the prism 29e and is reflected off the surface near the apex of the prism 29e to be directed toward the combiner 17. This light is reflected off the combiner 17 in the viewing direction and directed toward the eye point to be visually recognized as a virtual image 103 by the driver. The same holds for light emitted from the other light sources 28b, 28d, and 28f.

Because the three pairs of prisms 29a and 29b, 29c and 29d, and 29e and 29f are disposed different positions from each other in the front-rear direction, the optical paths of the respective rays of light emitted from the respective light sources differ in length from each other.

Specifically, the distances in the viewing direction of the driver (the front-rear direction) between each of the prisms 29a to 29f and the combiner 17 differ as indicated by distances D1, D2, and D3 illustrated in FIGS. 13 and 14. This results in differences corresponding to the distances D1, D2, and D3 in the optical path length from each of the light sources 28a to 28f to the eye point.

Due to these differences in the optical path length, the light emitted from the light sources 28a and 28b forms an image at the position of the virtual image 101, the light emitted from the light sources 28c and 28d forms an image at the position of the virtual image 102, and the light emitted from the light sources 28e and 28f forms an image at the position of the virtual image 103. Specifically, the virtual images 101 to 103 illustrated in FIG. 13 are formed at different positions in the depth direction from the driver so as to be visually recognized as if they were lit up at different positions in the front-rear direction.

The virtual images 101, 102, and 103 can display the guide lights 111a to 111f illustrated in FIG. 6. As a result, the guide lights 111a to 111f are imaged at positions different from each other in the front-rear direction.

As illustrated in FIG. 12, the display-light projector 22 is disposed posterior to the ambient light source 28. As a result, the optical path length from the display-light projector 22 to the combiner 17 is greater than the distances D1, D2, D3. Thus, the virtual images 101 to 103 are imaged posterior to the display image displayed on the combiner 17, and thus the guide lights 111a to 111f are imaged posterior to the display image.

[Configuration of Electrical Circuit]

Figure 15:
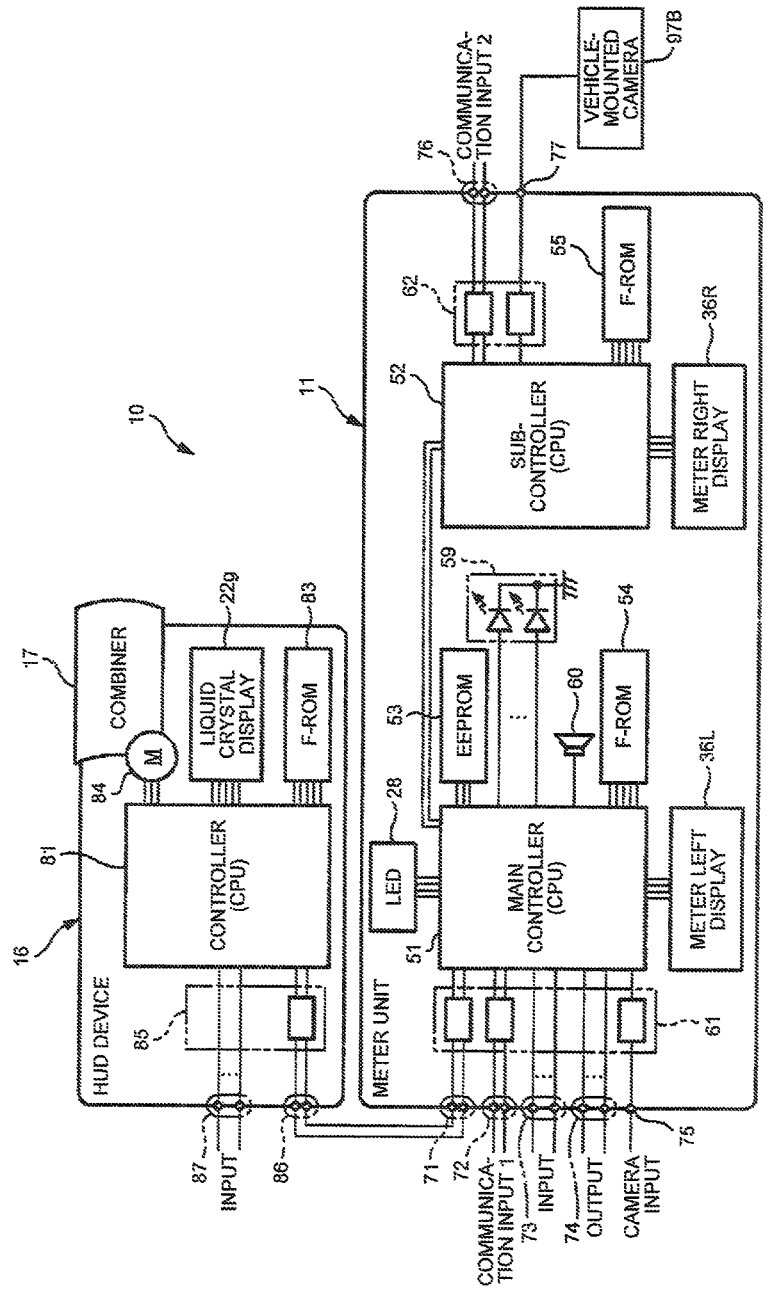
FIG. 15 is a block diagram illustrating the general configuration of electric circuits of the display unit.

FIG. 15 illustrates a general configuration of electric circuits of the display unit 10.

[Explanation of Meter Unit 11]

As illustrated in FIG. 15, the electric circuit of the roster unit 11 includes a male controller 51, a sub-controller 52, memories 53 to 55, the meter left display 36L, the meter right display 36R, the ambient light source 28, a light emitter 59, a speaker 60, and interfaces 61, 62.

The main controller 51 and the sub-controller 52 each include an independent microcomputer (central processing unit: CPU). The memory 53 is an electrically erasable programmable read-only memory (EEPROM). The memories 54, 55 are each a flash memory (F-ROM). The memories 53, 54 retain in advance a computer program required for operation of the main controller 51, various constants, display data, and the like. The memory 55 retains in advance a computer program required for operation of the sub-controller 52, various constants, display data, and the like.

The light emitter 59 constitutes an element that includes the light emitters 132a, 132b, 133a, 133b, 32a illustrated in FIG. 8 and the end-face light source 46 illustrated in FIG. 10.

The main controller 51 and the sub-controller 55 are connected to each other via a communication line so as to communicate with each other. Thus, the main controller 51 can communicate necessary information with the sub-controller 52 and control the sub-controller 52.

The electric circuit of the meter unit 11 includes a plurality of terminals connected to the main controller 51 via the interface 61. Specifically, a connector 71, a communication input part 72, an input part 73, an output part 74, and a camera input part 75 are connected to the interface 61. Additionally, the electric circuit of the meter unit 11 includes a communication input part 76 and a camera input part 77 connected to the sub-controller 52 via the interface 62.

The connector 71 of the meter unit 11 is connected to the HUD device 16 via a communication line. Thus, the main controller 51 can communicate necessary information with the HUD device 16 and control the HUD device 16.

The communication input part 72 and the communication input part 76 are each connected via a vehicular communication network to various electronic control units (ECUs) that control the vehicle. This enables the main controller 51 and the sub-controller 52 on the meter unit 11 to receive various types of vehicular information from the electronic control units of the vehicle. For example, the main controller 51 and the sub-controller 52 can receive information on the current vehicle speed. The main controller 51 and the sub-controller 52 can further receive a signal that includes position information of the vehicle from a position detecting device such as a global positioning system (GPS) receiver. In addition, the main controller 51 and the sub-controller 52 can receive a signal that includes information on fee collection from an electronic toll collecting system (ETC) in-vehicle device. Various input devices such as a cancel switch (not illustrated) to be described later and other switches and sensors can be connected to the input part 73 of the meter unit 11. Additionally, various output devices can be connected to the output part 74 of the meter unit 11.

An output of an vehicle-mounted camera 97B can be connected to each of the camera input part 75 and the camera input part 77 of the meter unit 11. Specifically, a video signal obtained from imaging by each camera may be input to the meter unit 11 by way of the camera input parts 75, 77.

The train controller 51 performs various types of processing according to the previously installed computer program and, while collecting and communicating various types of data, updates information to be displayed on the screen of the meter left display 36L. The main controller 51 can further control, for example, the lighting of the ambient light source 28, the lighting of the light emitter 59, the output of the speaker 60, the sub-controller 52, and the HUD device 16.

The sub-controller 52 performs various types of processing according to the previously installed computer program and inputs data from the communication input part 76 and thus camera input part 77 to update information to be displayed on the screen of the meter right display 36R. In addition, the sub-controller 52 updates information to be displayed on the screen of the meter right display 36R according to an instruction given by the main controller 51.

[Explanation of HUD Device 16]

As illustrated in FIG. 15, the electric circuit of the HUD device 16 includes a controller 81, the liquid crystal display 22g, a memory 83, an electric motor 84, an interface 85, a connector 86, and an input part 87.

The controller 81 includes a microcomputer (CPU). The memory 83 is a flash memory that retains therein in advance a computer program required for the operation of the HUD device 16, various constants, display data, and the like.

The electric motor 84 is a stepping motor connected to the drive mechanism 26 built in the driving unit assembly 24 illustrated in FIG. 7. Specifically, driving the electric motor 84 allows the driving unit subassembly 40 including the combiner 17 to be moved vertically.

The connector 86 and the input part 87 are connected to the controller 81 via the interface 85. The connector 86 is connected to the meter unit 11 via a communication line. Various input devices such as switches and sensors can be connected to the input part 87. For example, an operating switch for directing to start or stop HUD display is connected to the input part 87.

The controller 81 performs various types of processing according to the previously installed computer program and, while collecting and communicating various types of data via the connector 86 or the input part 87, updates information to be displayed on the screen of the liquid crystal display 22g. In addition, the controller 81 drives the electric motor 84 according to the direction to start or stop the HUD display, thereby positioning the combiner 17 at a predetermined display position or stored position.

[Explanation of Main Control Operation]

Figure 16:
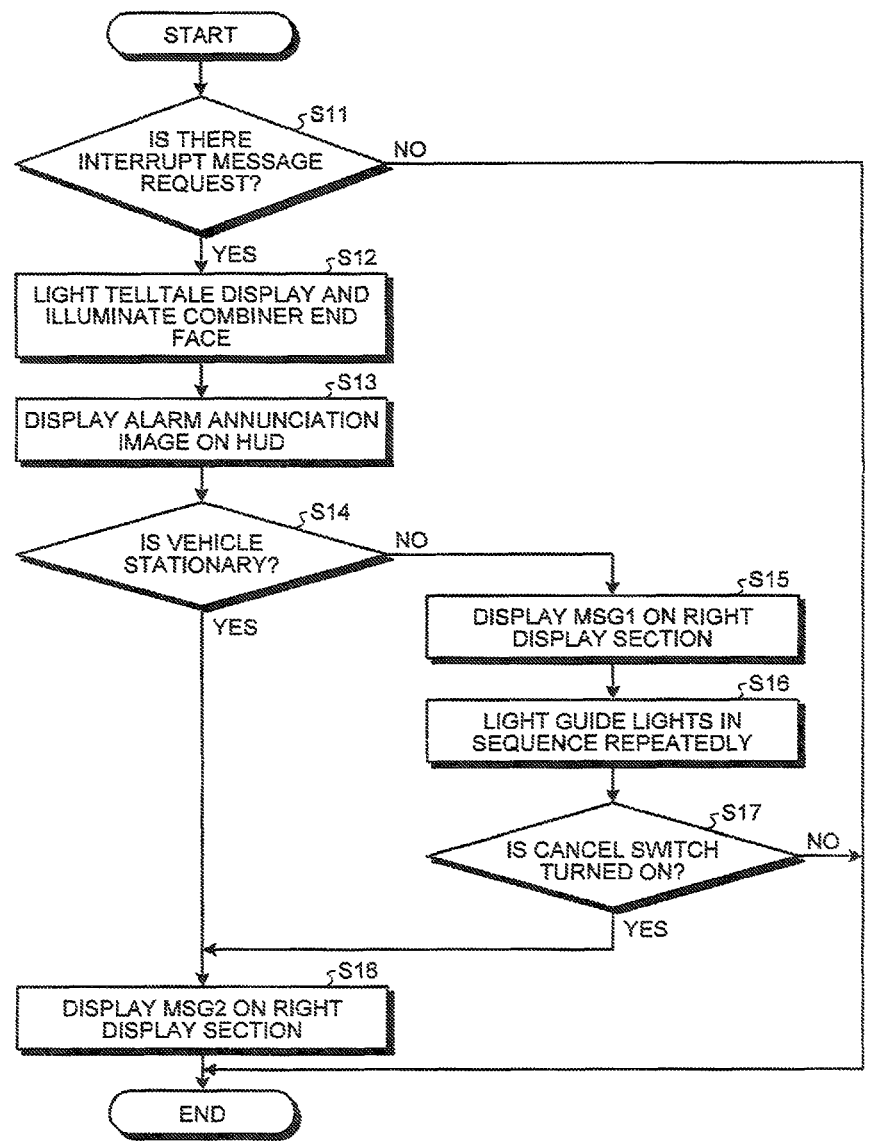
FIG. 16 is a flowchart illustrating exemplary main control operations of the display unit.

FIG. 16 illustrates exemplary main control operations of the display unit 10. FIG. 16 illustrates, more specifically, the detail of display control for issuing a warning when a fault occurring in the vehicle is detected by the system.

FIG. 17 illustrates an exemplary general display by the display unit 10 when a vehicle malfunction or any other failure occurs. When the processing illustrated in FIG. 16 is performed, the display unit 10 shifts into a display state illustrated in FIG. 17. To ensure easy understanding of the operations of the display unit 10, the display contents illustrated in FIG. 17 will first be outlined.

[Explanation of Exemplary Display]

As illustrated an FIG. 17, the HUD display area 107 (the first display area) and the ambient display area 109 are defined on a display area on the display light reflecting surface 17b of the combiner 17. The ambient display area 109 is disposed adjacent on the lower side of the HUD display area 107. The guide lights 111a to 111f are displayed on the ambient display area 109.

The HUD display area 107 is a rectangular area that displays a display content corresponding to a display content of the liquid crystal display 22g projected by the display-light projector 22. The HUD display area 107 displays an HUD display content 94B as a display content during a warning display. In FIG. 17, the HUD display area 107 displays, instead of the index indicating an ecology degree or driving, a warning annunciation element (the triangular pattern containing therein an exclamation mark "!") 108 as a display element for annunciating occurrence of a fault.

The example illustrated in FIG. 17 assumes that a malfunction or any other fault occurs. Thus, unlike a normal condition, the second display area 13a of the right side display 13 displays a warning message MSG1 (a detail describing element) as a right screen display content 92B. A specific example of the warning message MSG1 is as follows:

"'!' Brakes may fail. Immediately pull up the vehicle to a safe place."

Specifically, the right side display 13 displays, as the warning message MSG1, a text that describes the warning detail of the warning annunciation element 108 displayed in the HUB display area 107 and a dealing procedure therefor. Similarly to the normal condition illustrated in FIG. 6, the third display area 12a of the left side display 12 displays, as the left screen display content 91, the display element indicating the condition of the hybrid system, the speedometer, the fuel gauge, and the shift position of the transmission, for example.

The guide lights 111a to 111f will be described below. As described earlier, lighting each of the three light sources 28a, 28c, and 28e of the ambient light source 28 illustrated in FIG. 11 causes the corresponding one of the three guide lights 111a, 111c, and 111e to be displayed on the right side of the ambient display area 109. Similarly, lighting each of the three light sources 28b, 28d, and 28f of the ambient light source 28 causes the corresponding one of the three guide lights 111b, 111c, and 111f to be displayed on the left side of the ambient display area 109.

For example, light emitted from the light source 28a is projected onto the combiner 17 via the prism 29a and displayed as the guide light 111a as a virtual image on a central side of the ambient display area 109. Similarly, light from the light source 28c is displayed as the guide light 111c as a virtual image, and light from the light source 28e is displayed as the guide light 111e as a virtual image. That is, the three guide lights 111a, 111c, and 111e are displayed in line within the ambient display area 109. The three guide lights 111a, 111c, and 111e are disposed in line in this sequence in a direction Y1 (a first guiding direction) in which the straight line connecting the HUD display area 107 and the right side display 13 extends. The three guide lights 111b, 111d, and 111f are disposed in line in this sequence in a direction Y2 (a second guiding direction) in which the straight line connecting the HUD display area 107 and the left side display 12 extends.

In the present embodiment, as described earlier, the guide lights 111a, 111c, and 111e are configured so as to have an optical path length from the light source to the eye point increasing in this sequence, so that the guide lights 111a, 111c, and 111e are visually recognized as being posterior in this sequence from the driver. The same holds for the guide lights 111b, 111d, and 111f.

Lighting the light emitters 132a and 132b illustrated in FIG. 8 allows the respective guide lights 112a and 112b to be displayed. Similarly, lighting the light emitters 133a and 133b illustrated in FIG. 8 allows the respective guide lights 113a and 113b to be displayed.

Similarly to the guide lights 111a, 111c, and 111e in the ambient display area 109 described above, the guide lights 112a and 112b are disposed in line along the first guiding direction Y1. Similarly to the guide lights 111b, 111d, and 111f in the ambient display area 109 described above, the guide lights 113a and 113b are disposed in line along the second guiding direction Y2. The first guiding direction Y1 and the second guiding direction Y2 cross each other. In addition, as described earlier, the guide light 112a is visually recognized as being posterior to the guide light 112b, and the guide light 113a is visually recognized as being posterior to the guide light 113b.

Figure 18A:
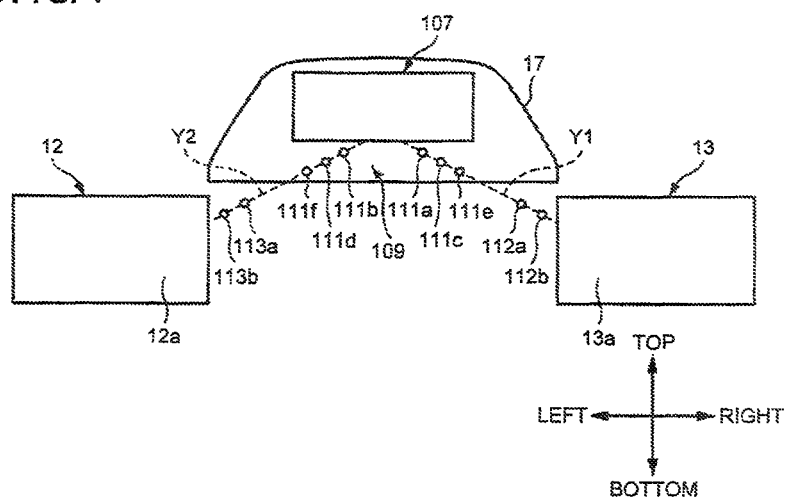
FIGS. 18A and 18B are explanatory drawings for illustrating the disposition of guide lights for guiding the sight line, FIG. 18A being a schematic view illustrating the display unit as viewed in a viewing direction and FIG. 18B being a plan view illustrating the image forming positions with respective to the components illustrated in FIG. 18A.
Figure 18B:
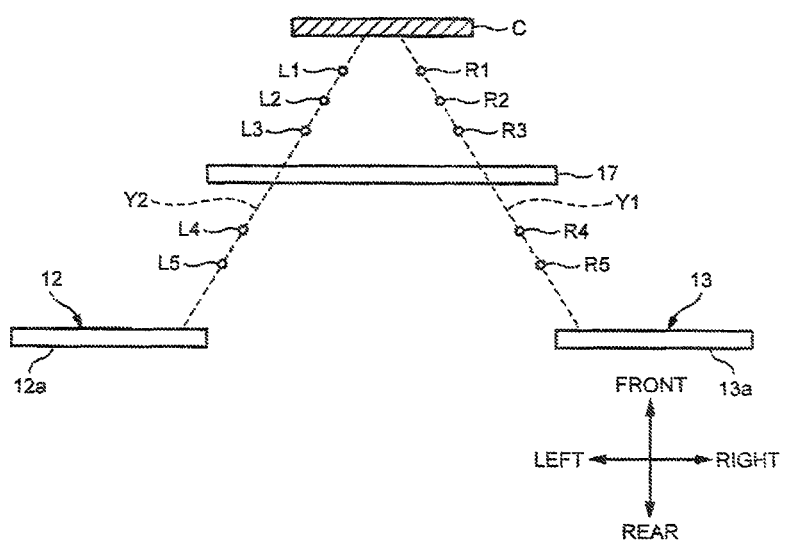

The image forming position of each guide light will be further described with reference to FIGS. 18A and 18B. FIGS. 18A and 18B are explanatory drawings for illustrating the disposition of the guide lights used for guiding the sight line, FIG. 18A being a schematic view illustrating the display unit as viewed in the viewing direction and FIG. 18B being a plan view illustrating the image forming positions with respective to the components illustrated in FIG. 18A. FIG. 18A schematically illustrates positions at which the guide lights 111a to 111f, 112a, 112b, 113a, and 113b are lit steadily, using the respective reference numerals. FIG. 18B schematically illustrates the image forming position of the display light defining the HUD display area 107 by a reference numeral C, the image forming positions of the guide lights 111a, 111c, 111e, 112a, and 112b by reference numerals R1, R2, R3, R4, and R5, respectively, and the image forming positions of the guide lights 111b, 111d, 111f, 113a, and 113b by reference numerals L1, L2, L3, L4, and L5, respectively.

As illustrated in FIGS. 18 and 18B, the image forming position of the display light is posterior to the image forming positions of the guide lights 111a to 111f. This is because, as described earlier, the optical path length from the combiner 17 to the display-light projector 22 is greater than the optical path lengths D1 to D3 from the combiner 17 to the respective light sources 28a to 28f in the viewing direction (front-rear direction). Specifically, the optical path length from the combiner 17 to the display-light projector 22 is the largest, followed in order by the optical path length D1 from the combiner 17 to the light sources 28a, 28b, the optical path length D2 from the combiner 17 to the light sources 28c, 28d, and the optical path length D3 from the combiner 17 to the light sources 28e, 28f.

As illustrated in FIG. 18B, the left side display 12 and the right side display 13 are disposed anterior to the combiner 17 in the viewing direction (front-rear direction). In addition, as illustrated in FIG. 18A, the right side display 13 is disposed such that the second display area 13a is disposed outside of the first guiding direction Y1 relative to the guide lights 111a, 111c, and 111e as viewed in the viewing direction (front-rear direction). Similarly, the left side display 12 is disposed such that the third display area 12a is disposed outside of the second guiding direction Y2 relative to the guide lights 111b, 111d, and 111f as viewed in the viewing direction (front-rear direction).

The guide light 112a is disposed between the combiner 17 and the right side display 13 in the viewing direction (front-rear direction) and can be visually recognized at a position between the guide light 111e and the second display area 13a as viewed in the viewing direction. The guide light 112b is disposed between the guide light 112a and the right side display 13 in the viewing direction (front-rear direction) and can be visually recognized at a position between the guide light 112a and the second display area 13a as viewed in the viewing direction. Similarly, the guide light 113a is disposed between the combiner 17 and the left side display 12 in the viewing direction (front-rear direction) and can be visually recognized at a position between the guide light 111f and the third display area 12a as viewed in the viewing direction; and the guide light 113b is disposed between the guide light 113a and the left side display 12 in the viewing direction (front-rear direction) and can be visually recognized at a position between the guide light 113a and the third display area 12a as viewed in the viewing direction.

[Explanation of Processing Illustrated in FIG. 16]

The processing illustrated in FIG. 16 will be described below. The control for the processing illustrated in FIG. 16 may be performed mainly by the main controller 51 or the sub-controller 52 of the meter unit 11, or by the controller 81 of the HUD device 16. The following description assumes that the main controller 51 mainly performs the control.

When the ignition switch of the vehicle is turned on, the processing illustrated in FIG. 16 is repeatedly performed.

An initializing operation (not illustrated) to be performed immediately after the ignition switch is turned on causes the meter unit 11 and the HUD device 16 to start a display operation. Specifically, the main controller 51 controls the left side display 12, the right side display 13, and the center display 14 into respective display-enabled conditions, and causes the third display area 12a of the left side display 12 to display information representing the condition of various components of the vehicle, e.g., the speedometer, the fuel gauge, and the shift position of the transmission. A warning and other contents are displayed mainly on the center display 14. Meanwhile, in the HUB device 16, the electric motor 84 is driven to move the combiner 17 to the use position in which the combiner 17 protrudes upwardly from the instrument panel. In addition, the main controller 51 starts display of the liquid crystal display 22g of the display-light projector 22, and starts to project the display light displayed on the screen of the liquid crystal display 22g onto the combiner 17.

At Step S11 in FIG. 16, the main controller 51 determines whether there is an interrupt message request. If an interrupt message request is detected, the processing proceeds to Step S12; if no interrupt message request is detected, the processing in FIG. 16 is terminated.

The interrupt message will be described below. The vehicle includes an engine and various electric components mounted thereon and a plurality of electronic control units (ECUs) for controlling the engine and the electric components. Each of these ECUs constantly monitors a malfunction or a fault of the electric component(s) it controls and, if a malfunction, for example, is detected, issues a request for an interrupt message relating to the corresponding warning. This request is applied over a vehicular communication network to the main controller 51 via, for example, the communication input parts 72, 76 illustrated in FIG. 15. When there is an interrupt message request, the display unit 10 according to the embodiment determines that an event involving a need to guide the sight line to the outside of the first guiding direction Y1 has occurred, and performs a sight line guiding operation using the guide lights, which will be described below.

At Step S12, to annunciate the occurrence of a vehicle fault, the main controller 51 uses, for example, the center display 14 to light a telltale display (not illustrated). This allows the driver to visually recognize the telltale display on the center display 14 to notice that the occurrence of a fault is being annunciated. In addition, at Step S12, the main controller 51 controls the lighting condition of the end face light source 46 to flash the end face light source 46. This causes the illumination light of the end face light source 46 to enter the illumination light entering part 17a of the combiner 17. The illumination light reflected off the illumination light reflecting part 17c in the end face of the combiner 17 is directed toward the driver side. This allows the driver to visually recognize the end face of the combiner 17 being illuminated brightly in a band as illustrated in FIG. 9A and then notice that the occurrence of a fault is being annunciated.

At Step S13, the main controller 51 instructs the HUD device 16 to display the warning annunciation element 108. According to this instruction, the HUD device 16 changes the display content. Specifically, the display content is changed from the normal condition of the HUD display content 94A illustrated in FIG. 6 to the HUD display content 94B illustrated in FIG. 17. Specifically, the warning annunciation element 108 is displayed on the HUD display area 107 of the combiner 17 as illustrated in FIG. 17.

At Step S14, the main controller 51 refers to the latest vehicle speed information and determines whether the vehicle is pulled up. If the own vehicle is pulled up, the processing proceeds from Step S14 to Step S18. If the own vehicle is running, the processing proceeds to Step S15.

At Step S15, the main controller 51 instructs the sub-controller 52 to display the warning message MSG1 on the screen of the meter right display 36R, specifically, the right side display 13. Specifically, the display content is changed from the normal condition of the right screen display content 92A illustrated in FIG. 6 to the right screen display consent 92B illustrated in FIG. 17. Specifically, in the embodiment, when the main controller 51 receives an interrupt message request (a warning display signal) at Step S11, it displays the naming annunciation element 1058 on the HUD display area 107 and the warning massage MSG1 (the detail describing element) on the second display area 13a.

At Step S16, the main controller 51 performs guiding control for guiding the sight line of the driver from the HUD display area 107 to the right side display 13. Specifically, the main controller 51 lights up the guide lights 111a, 111c, 111e, 112a, and 112b one by one in this sequence toward the right as illustrated in FIGS. 19A to 19E. After all of these five guide lights are lit as illustrated in FIG. 19E, the main controller 51 turns off all these five guide lights, and lights up again the guide lights 111a, 111c, 111e, 112a, and 112b one by one in this sequence. These operations are repeatedly performed.

At Step S17, the main controller 51 waits for the cancel switch (not illustrated) to be operated. The cancel switch is operable by the driver and can be operated by the driver after he/she visually has recognized and confirmed the warning message MSG1. If the cancel switch is operated by the driver, the processing proceeds to Step S18. If the cancel switch is not operated, Step S17 is repeatedly performed until the cancel switch is operated.

At Step S18, the main controller 51 instructs the sub-controller 52 to display a predetermined warning message MSS2 (not illustrated) on the screen of the meter right display 36R, specifically, the second display area 13a of the right side display 13. A specific example of the warning message MSG2 is as follows:

"'!' The brake system has failed. Stop driving and have your vehicle checked immediately."

Thus, a malfunction or any other fault occurring in the vehicle will lead to the display condition as illustrated in FIG. 17, so that the driver first visually recognize the warning annunciation element 108 displayed on the HUD display area 107 that offers the highest visibility. The driver can recognize that some fault has occurred, but cannot know at this time the kind of fault and any way or dealing with it. Thereafter, the five guide lights 111a, 111c, 111e, 112a, and 112b are lit in this sequence to gradually guide the sight line of the driver from the warning annunciation element 108 to the right side display 13. The driver can then visually recognize the warning message MSG1 displayed on the second display area 13a of the right side display 13. As a result, by visually recognizing the warning message MSG1, the driver can properly figure out the specific detail of the fault that has occurred and the relevant way of dealing with it.

In the processing described, the five guide lights 111a, 111c, 111e, 112a, and 112b are lit in this sequence to guide the sight line. The sequence of lightening the guide lights is not limited to the foregoing as long as the sight line can be guided. A possible alternative approach is repeating the following steps: lighting the guide lights 111a, 111c, and 111e at once; turning off the guide lights 111a, 111c, and 111e and then lighting the guide lights 112a and 112b simultaneously; and thereafter, turning off the guide lights 112a and 112b.

In the foregoing processing, at displaying the five guide lights 111a, 111c, 111e, 112a, and 112b, the corresponding light sources 28e, 28c, 28a, and 32b are controlled so as to emit red light. Specifically, of the light emitting diodes emitting red light and green light, only the light emitting diodes emitting red light are energized to emit light. However, the red light emitting diodes and the green light emitting diodes may be alternately energized. The pattern of luminescent color is not limited.

In the processing described above, the sight line is guided from the HUD display area 107 to the right side display 13. Nonetheless, the warning message for describing the detail of the warning may be displayed on the third display area 12a of the left side display 12: in this case the sight line can be guided from the HUD display area 107 toward the left side display 12. Specifically, the five guide lights 111b, 111d, 111f, 113a, and 113b may be lit in this sequence to guide the sight line from the HUD display area 107 toward the third display area 12a of the left side display 12.

Thus, the main controller 51 can change the guiding-direction according to the situation as appropriate. Specifically, when detecting a signal that represents an event involving a need to guide the sight line from the HUD display area 107 toward the second display area 13a, the main controller 51 uses the guide lights 111a, 111c, 111e, 112a, and 112b on the right side to guide the sight line. Alternatively, when detecting a signal that represents an event involving a need to guide the sight line from the HUD display area 107 toward the third display area 12a, the main controller 51 uses the guide lights 111b, 111d, 111f, 113a, and 113b on the left side to guide the sight line.

In the processing described above, the sight line is guided from the HUD display area 107 to the right side display 13. In contrast, the sight line can be guided from the right aide display 13 to the HUD display area 107. Specifically, the five guide lights 112b, 112a, 111e, 111c, and 111a may be lit in this sequence to guide the sight line from the right side display 13 toward the HUD display area 107.

Additionally, in the embodiment described heretofore, the reflecting surface of the combiner 17 is used for performing the HUD display. In place of the combiner 17, for example, part of the front windshield (window) of the vehicle may be used as the reflecting plate of the HUD device.

Effects of the HUD declare 1 and the display unit 10 according to the embodiment will be described below.

(1) The display unit 10 according to the embodiment includes: the main controller 51 (controller) capable of controlling the display content of the HUD display area 107 (first display area) in the combiner 17 (first device) of the HUD device 16 and the display content of the second display area 13a in the right side display 13 (second device) of the meter unit 11 different from the first device; a first light source (e.g. the light source 28a) connected to the main controller 51 and configured to display a first guide light (e.g. the guide light 111a) between the HUD display area 107 and the second display area 13a in a viewing direction of the HUD display area 107 and the second display area 13a; and a second light source (e.g. the light source 28c) connected to the main controller 51 end configured to display a second guide light (e.g. the guide light 111c) between the guide light 111a and the second display area 13a in the viewing direction. The main controller 51, when receiving a signal indicating that an event involving a need to guide the sight line from the HUD display area 107 to the second display area 13a has occurred, causes the light source 28a to display the guide light 111a and then causes the light source 28c to display the guide light 111c.

When an event involving a need to guide the sight line from the ambient display area 109 to the second display area 13a occurs, the foregoing configuration allows the guide light 111a and the guide light 111c to be displayed in this sequence, which can guide the driver's sight line from the HUD display area 107 to the second display area 13a.

The above description regards the guide light 111a and the guide light 111c as the first guide light and the second guide light, respectively. Nonetheless, the guide light 111c and the guide light 111e may be regarded as the first guide light and the second guide light, respectively; lure guide light 111e and the guide bight 112a may be regarded as the first guide light and the second guide light, respectively; or the guide light 112a and the guide light 112b may be regarded as the first guide light and the second guide light, respectively. That is, any one of the guide lights may be regarded as the first guide light, and any guide light displayed between the guide light regarded as the first guide light and the second display area 13a may be regarded as the second guide light.

Additionally, the above description regards the combiner 17 of the HUD device 16 as the first device, and the right side display 13 of the meter unit 11 as the second device. Nonetheless, the right side display 13 of the meter unit 11 may be regarded as the first device, and the combiner 17 of the HUD device 16 may be regarded as the first device. In this case, any one of the guide lights may be regarded, as the first guide light, and any guide light displayed between the guide light regarded as the first guide light and the HUD display area 107 (in this case, regarded as the second display area) may be regarded as the second guide light. For example, the guide light 111c may be regarded as the first guide light, and the guide light 111a may be regarded as the second guide light, (2) In the display unit 10 according to the embodiment, the main controller 51, when receiving an interrupt message request (the warning display signal) as a signal, displays the warning annunciation element 108 for annunciating a warning on the HUD display area 107 and the warning message MSG1 (the detail describing element) for describing the detail of the warning on the second display area 13a. The main controller 51 further causes the light source 28a to display the guide light 111a and then, causes the light, source 28c to display the guide light 111c.

This allows the driver's sight line to he guided freer the HUD display area 107 on which the warning annunciation element 108 is displayed to the second display area 13a on which the warning message MSG1 is displayed.

(3) In the display unit 10 according to the embodiment, the first device is the combiner 17 of the HUD device 16, and the second device is the display section of the meter unit 11.

This can guide the sight line from the HUD display area 107 defined on the combiner 17 of the HUD device 16 to the second display area 13a defined on the right side display 13 of the meter unit 11.

(4) In the display unit 10 according to the embodiment, the HUD device 16 includes the display-light projector 22 configured to project display light including a display image onto the combiner 17, and the light source 28a configured to project emitted light onto the combiner 17. The display light from the display-light projector 22 is reflected by the combiner 17 in the viewing direction to define the HUD display area 107 on the combiner 17. The emitted light from the light source 28a is reflected by the combiner 17 in the viewing direction, causing the guide light 111a to be displayed on the combiner 17.

This can guide the sight line from the HUD display area 107 defined on the combiner 17 of the HUD device 16 to the second display area 13a defined on the right side display 13 of the meter unit 11, by using the guide light 111a displayed on the combiner 17 by the light source 28a of the HUD device 16.

(5) In the display unit 10 according to the embodiment, the right side display 13 is disposed anterior to the combiner 17 in the viewing direction. The HUD device 16 further includes the light source 28c configured to project emitted light onto the combiner 17. The emitted light from the light source 28c is reflected by the combiner 17 in the viewing direction, causing the guide light 111c to be displayed on the combiner 17. In the viewing direction, the optical path length from the combiner 17 to the projector is the largest, followed in order by the optical path length (D1) from the combiner 17 to the light source 28a, and the optical path length (D2) from the combiner 17 to the light source 28c.

This can guide the sight line from the HUD display area 107 defined on the combiner 17 of true HUD device 16 to the second display area 13a defined on the right side display 13 of the meter unit 11, by using the guide lights 111a, 111c displayed on the combiner 17 by the light sources 28a, 28c of the HUD device 16.

With the HUD device 16, in particular, the optical length of the display-light projector 22 is the largest, followed in order by the optical length of the light source 28a, and the optical length of the light source 28c. This allows the driver, to visually recognize the guide light 111a and the guide light 111c anterior to the display image on the HUD display area 107, and the guide light 111a posterior to the guide light 111c. Thus, when, the light source 28c is lit after the light source 28a, the guide light 111c lights up after the guide light 111a, so that the focal position of the driver can move from the rear toward the front in order of the display image on the HUD display area 107, which is visually recognized the farthest, the guide light 111a, and the guide light 111c. As a result, even when the combiner 17 is disposed posterior in the viewing direction to the right side display 13, displaying the guide light 111a and the guide light 111c in this sequence allows the driver's sight line to move comfortably from the combiner 17 to the right side display 13. The display unit 10 thus facilitates guiding the driver's sight line.

(6) In the display unit 10 according to the embodiment, the meter unit 11 includes the light emitter 132a (a second light source) for displaying the guide light 112a (the second guide light).

This can guide the sight line from the HUD display area 107 defined on the combiner 17 of the HUD device 16 to the second display area 13a defined on the right side display 13 of the meter unit 11, by using the light emitter 132a of the meter unit 11.

(7) In the display unit 10 according to the embodiment, the right side display 13 is disguised anterior to the combiner 17 in the viewing direction. The guide light 112a will be displayed between the HUD display area 107 and the right side display 13 in the viewing direction.

Thus, lighting the light emitter 132a after the light source 28a causes the guide light 112a, which, will be visually recognized anterior to the combiner 17, to light after the guide light 111a posterior to the combiner 17. This can move the focal position of the driver from the rear toward the front, that is, from the display image on the HUD display area 107 to the guide light 111a and then the guide light 112a in this sequence. As a result, even when the combiner 17 is disposed posterior in the viewing direction to the right side display 13 of the meter unit 11, displaying the guide light 111a and the guide light 112a in this sequence allows the driver's sight line to move comfortably from the combiner 17 to the right side display 13 of the meter unit 11. The display unit 10 thus facilitates guiding the driver's sight line.

(8) In the display unit 10 according to the embodiment, the main controller 51 is further capable of controlling a display content of the third display area 12a in the left side display 12 (a third device) that is different from the combiner 17 (the first device) or the right side display 13 (the second device). The display unit 10 further includes: a third light source (e.g. the light source 28b) connected to the main controller 51 and configured to display a third guide light (e.g. the guide light 111b) between the HUD display area 107 and the third display area 12a in the viewing direction; and a fourth light source (e.g. the light source 28d) connected to the main controller 51 and configured to display a fourth guide light (e.g. the guide light 111d) between the guide light 111b and the third display area 12a in the viewing direction. The main controller 51, when receiving a signal indicating that an event involving a need to guide the sight line from the HUD display area 107 to the second display area 13a has occurred, causes the light source 28a to display the guide light 111a and then causes the light source 28c to display the guide light 111c; and when receiving a signal indicating that an event involving a need to guide the sight line from the HUD display area 107 to the third display area 12a has occurred, causes the light source 28b to display the guide light 111b and then causes the light source 28d to display the guide light 111d.

The display unit 10 can guide the driver's sight line from the HUD display area 107 to both the second display area 13a and the third display area 12a.

(9) In the display unit 10 according to the embodiment, the first device is the combiner 17 of the HUD device 16, the second device is a first display section (the right side display 13) of the meter unit 11, and the third device is a second, display section (the left side display 12) of the meter unit 11.

In the display unit according to one aspect of the present invention, when an event involving a need to guide the sight line from the first display area to the second display area occurs, the first guide light and the second guide light are displayed in this sequence. Thus, the sight line of the driver can be guided from the first display area to the second display area.

It is noted that various devices and display areas can be selected for the first device, the first display area, the second device, and the second display area. For example, the first device can be a reflecting plate of a head-up display device, the first display area can be a display area defined on the reflecting plate, the second device can be a display section of a meter unit, and the second display area can be a display screen of the display section. This can guide the sight line from the first display area on the reflecting plate to the second display area of the display section. Alternatively, the first and the second of these elements may be switched for another configuration in which the sight line is guided from the first display area of the display section to the second display area of the reflecting plate of the head-up display device. Still another configuration can be that the first device is a first display section of the meter unit, the second device is a second display section of the meter unit, and the first display area and the second display area are the display screens of the first display section and the second display section, respectively, thereby allowing the sight line to be guided from the first display section to the second display section.

In addition, the first guide light and the second guide light may be displayed in various modes selected as appropriate. For example, the head-up display device may include a light source: in this case, light emitted from the light source is reflected by the reflecting plate in the viewing direction, so that the guide light is displayed on the reflecting plate. Alternatively, the meter unit may include a light source: in this case, the light source lights up for displaying the guide light. The head-up display device or the meter unit may include both of the first light source and the second light source, or each may include one light source. Still alternatively, a light source may be disposed in any place other than the first device and the second device in the display unit.

In the display unit according to another aspect of the present invention, the sight line can be guided from the first display area defined on the reflecting plate of the head-up display device to the second display area defined on the display section of the meter unit.

In the display unit according to still another aspect of the present invention, the sight line can be guided from the first display area defined on the reflecting plate or the head-up display device to the second display area defined on the display section of the meter unit, by using the first guide light displayed on the reflecting plate by the first light source included in the head-up display device.

In the display unit according to still another aspect of the present invention, the sight line can be guided from the first display area defined on the reflecting plate of the head-up display device to the second display area defined on the display section of the meter unit, by using the second guide light displayed by the second light source included in the meter unit.

In the display unit according to still another aspect of the present invention, when an event involving a need to guide the sight line from the first display area to the second display area occurs, the sight line of the driver can be guided from the first display area to the second display area by using the first guide light and the second guide light. When an event involving a need to guide the sight line from the first display area to the third display area occurs, the sight line of the driver can be guided from the first display area to the third display area by using the third guide tight and the fourth guide light. The driver's sight line can thus be guided from the first display area either to the second display area, or to the third display area.

In the display unit according to still another aspect of the present invention, the sight line of the driver can be guided from the first display area defined on the reflecting plate of the head-up display device either to the second display area defined on the first display section of the meter unit or to the third display area defined on the second display section of the meter unit.

In the display unit according to still another aspect of the present invention, the sight line of the driver can be guided from the first display area on which the warning annunciation element is displayed to the second display area on which the detail describing element is displayed.

The display unit according to the present invention provides a display unit capable of guiding the sight line of the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display unit comprising:
   a first device having a first display area;
   a second device having a second display area, the second device is different and spaced apart from the first device;
   a controller configured to selectively control a display content of the first display area formed in the first device and a display content of the second display area formed in the second device;
   a first light source connected to the controller and configured to display a first guide light, the first guide light is located on a guide line that extends from the first display area to the second display area, and the first guide light is located between the first display area and the second display area; and
   a second light source connected to the controller and configured to display a second guide light, the second guide light is located on the guide line that extends from the first display area to the second display area, and the second guide light is located between the first guide light and the second display area, wherein
   the controller, when receiving a signal indicating that an event involving a need to guide a sight line from the first display area to the second display area has occurred, causes the first light source to display the first guide light, and thereafter, causes the second light source to display the second guide light such that a guide pattern extends from the first display area to the second display area along the guide line.

2. The display unit according to claim 1, wherein
   the first device is a reflecting plate of a head-up display device, and
   the second device is a display section of a meter unit.

3. The display unit according to claim 2, wherein
   the head-up display device includes a projector configured to project display light including a display image onto the reflecting plate, and a first light source configured to project emitted light onto the reflecting plate,
   the display light from the projector is reflected by the reflecting plate in a viewing direction to define the first display area on the reflecting plate, and
   the emitted light from the first light source is reflected by the reflecting plate in the viewing direction, causing the first guide light to be displayed on the reflecting plate.

4. The display unit according to claim 2, wherein
   the meter unit includes a second light source that displays the second guide light.

5. The display unit according to claim 1, wherein
   the controller is further capable of controlling a display content of a third display area formed in a third device that is different from the first device or the second device,
   the display unit further comprises:

a third light source connected to the controller and configured to display a third guide light between the first display area and the third display area in the viewing direction; and a fourth light source connected to the controller and configured to display a fourth guide light between the third guide light and the third display area in the viewing direction, and the controller, when receiving a signal indicating that an event involving a need to guide the sight line from the first display area to the second display area has occurred, causes the first light source to display the first guide light and then causes the second light source to display the second guide light, and when receiving a signal indicating that an event involving a need to guide the sight line from the first display area to the third display area has occurred, causes the third light source to display the third guide light and then causes the fourth light source to display the fourth guide light.

6. The display unit according to claim 5, wherein the first device is a reflecting plate of a head-up display device, the second device is a first display section of a meter unit, and the third device is a second display section of the meter unit.

7. The display unit according to claim 1, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

8. The display unit according to claim 3, wherein the meter unit includes a second light source that displays the second guide light.

9. The display unit according to claim 2, wherein the controller is further capable of controlling a display content of a third display area formed in a third device that is different from the first device or the second device, the display unit further comprises:

a third light source connected to the controller and configured to display a third guide light between the first display area and the third display area in the viewing direction; and a fourth light source connected to the controller and configured to display a fourth guide light between the third guide light and the third display area in the viewing direction, and the controller, when receiving a signal indicating that an event involving a need to guide the sight line from the first display area to the second display area has occurred, causes the first light source to display the first guide light and then causes the second light source to display the second guide light, and when receiving a signal indicating that an event involving a need to guide the sight line from the first display area to the third display area has occurred, causes the third light source to display the third guide light and then causes the fourth light source to display the fourth guide light.

10. The display unit according to claim 3, wherein the controller is further capable of controlling a display content of a third display area formed in a third device that is different from the first device or the second device, the display unit further comprises:

a third light source connected to the controller and configured to display a third guide light between the first display area and the third display area in the viewing direction; and a fourth light source connected to the controller and configured to display a fourth guide light between the third guide light and the third display area in the viewing direction, and the controller, when receiving a signal indicating that an event involving a need to guide the sight line from the first display area to the second display area has occurred, causes the first light source to display the first guide light and then causes the second light source to display the second guide light, and when receiving a signal indicating that an event involving a need to guide the sight line from the first display area to the third display area has occurred, causes the third light source to display the third guide light and then causes the fourth light source to display the fourth guide light.

11. The display unit according to claim 1, wherein the controller is further capable of controlling a display content of a third display area formed in a third device that is different from the first device or the second device, the display unit further comprises:

a third light source connected to the controller and configured to display a third guide light between the first display area and the third display area in the viewing direction; and a fourth light source connected to the controller and configured to display a fourth guide light between the third guide light and the third display area in the viewing direction, and the controller, when receiving a signal indicating that an event involving a need to guide the sight line from the first display area to the second display area has occurred, causes the first light source to display the first guide light and then causes the second light source to display the second guide light, and when receiving a signal indicating that an event involving a need to guide the sight line from the first display area to the third display area has occurred, causes the third light source to display the third guide light and then causes the fourth light source to display the fourth guide light.

12. The display unit according to claim 2, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

13. The display unit according to claim 3, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

14. The display unit according to claim 4, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

15. The display unit according to claim 5, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

16. The display unit according to claim 6, wherein the controller, when receiving a warning display signal as the signal, displays a warning annunciation element for annunciating a warning on the first display area and a detail describing element for describing a detail of the warning on the second display area, and the controller causes the first light source to display the first guide light and then causes the second light source to display the second guide light.

* * * * *